United States Patent
Khan et al.

(10) Patent No.: US 6,671,450 B2
(45) Date of Patent: Dec. 30, 2003

(54) APPARATUS AND METHOD TO METALLIZE, REINFORCE, AND HERMETICALLY SEAL MULTIPLE OPTICAL FIBERS

(75) Inventors: Mohammad Zubair Khan, San Jose, CA (US); Maria G. Guardado, San Jose, CA (US); Rickquel B. Garcia, Union City, CA (US)

(73) Assignee: Lightwave Microsystems Corporation, San Jose, CA (US)

(*) Notice: Subject to any disclaimer, the term of this patent is extended or adjusted under 35 U.S.C. 154(b) by 202 days.

(21) Appl. No.: 09/887,367

(22) Filed: Jun. 21, 2001

(65) Prior Publication Data

US 2002/0051617 A1 May 2, 2002

Related U.S. Application Data

(63) Continuation-in-part of application No. 09/654,459, filed on Sep. 1, 2000, now abandoned.

(51) Int. Cl.[7] .............................. G02B 6/00; G02B 6/44
(52) U.S. Cl. ........................ 385/137; 385/94; 385/120
(58) Field of Search .............................. 385/88–94, 120, 385/14, 52, 134, 136, 137

(56) References Cited

U.S. PATENT DOCUMENTS

| | | | | |
|---|---|---|---|---|
| 3,798,099 A | * | 3/1974 | Marcatili | 156/158 |
| 4,707,065 A | | 11/1987 | Jenkins | |
| 5,061,035 A | * | 10/1991 | Rogers, Jr. | 385/115 |
| 5,611,017 A | * | 3/1997 | Lee et al. | 385/114 |
| 5,832,149 A | * | 11/1998 | Omizu et al. | 385/20 |
| 5,889,914 A | * | 3/1999 | Gentsu | 385/137 |
| 5,970,194 A | | 10/1999 | Dunn et al. | |
| 6,004,042 A | * | 12/1999 | Million et al. | 385/59 |
| 6,035,088 A | * | 3/2000 | Chandraiah et al. | 385/114 |
| 6,112,002 A | * | 8/2000 | Tabuchi | 385/50 |
| 6,524,017 B2 | * | 2/2003 | Lecocq et al. | 385/88 |
| 2001/0001622 A1 | | 5/2001 | Tatoh | |

FOREIGN PATENT DOCUMENTS

| | | | | |
|---|---|---|---|---|
| EP | 0 679 912 | | 11/1995 | |
| EP | 0 770 893 | | 5/1997 | |
| EP | 0 860 721 | | 8/1998 | |
| EP | 0860721 B1 | * | 8/1998 | G02B/6/24 |
| JP | 62211604 A | * | 9/1987 | G02B/6/00 |
| JP | 63085609 A | * | 4/1988 | G02B/6/42 |
| JP | 07092334 | | 4/1995 | |
| JP | 07234321 A | * | 9/1995 | G02B/6/00 |
| JP | 07287140 A | * | 10/1995 | G02B/6/255 |
| JP | 08015550 | | 1/1996 | |
| JP | 08043641 A | * | 2/1996 | G02B/6/00 |
| JP | 10104466 A | * | 4/1998 | G02B/6/40 |

OTHER PUBLICATIONS

Rassaian, M. et al. (1995). "Hermeticity Lifetime of a 63Sn37Pb Solder Sealed Optical Fiber Feedthrough" *Proceedings of the Electronic Components and Technology Conference—Las Vegas* IEEE: New York. vol. 45. pp. 1110–1115.

U.S. patent application Ser. No. 09/654,459, Khan et al., filed Sep. 1, 2000.

* cited by examiner

Primary Examiner—Akm Enayet Ullah
Assistant Examiner—Michelle R. Connelly-Cushwa
(74) Attorney, Agent, or Firm—Morrison & Foerster LLP

(57) ABSTRACT

Apparatus and methods to metallize, reinforce, and hermetically seal multiple optical fibers are described herein. A ribbon of optical fibers may be placed into a fixture to expose a mid-span segment for removal of the coatings from the optical fibers by acid etching, laser, etc. A variety of metallic coatings may then be deposited onto the bare segment of the optical fibers. The metallized segment of optical fibers are then deposited with solderable alloy onto a plate for attachment to the plate for reinforcement of the metallized segment. The plate and metallized segment is then fed through a package opening and hermetically sealed to internally connect one or more components inside the package by heating the package to melt additional solder around the opening or gap. Epoxy is then applied over the solder to help protect the solder and additionally seal the package.

44 Claims, 18 Drawing Sheets

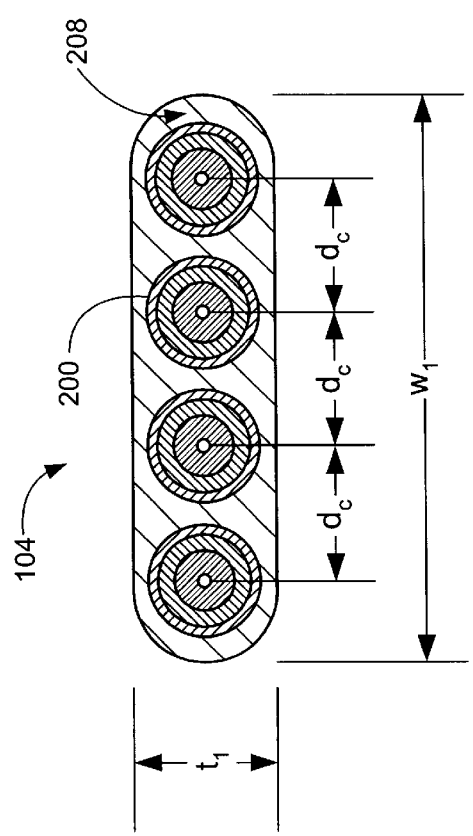
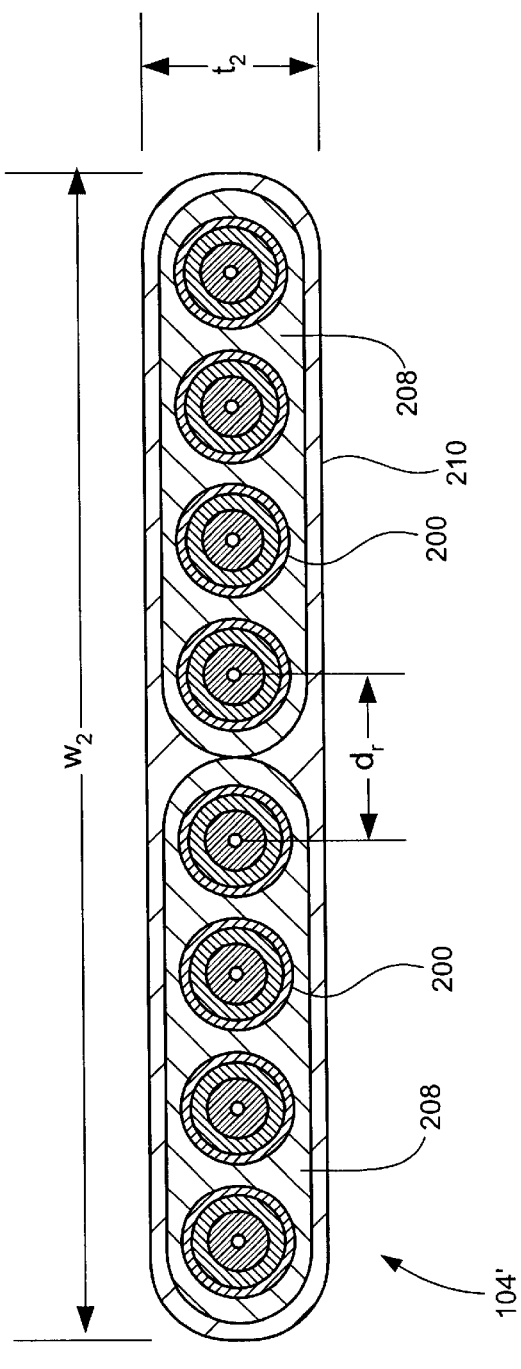

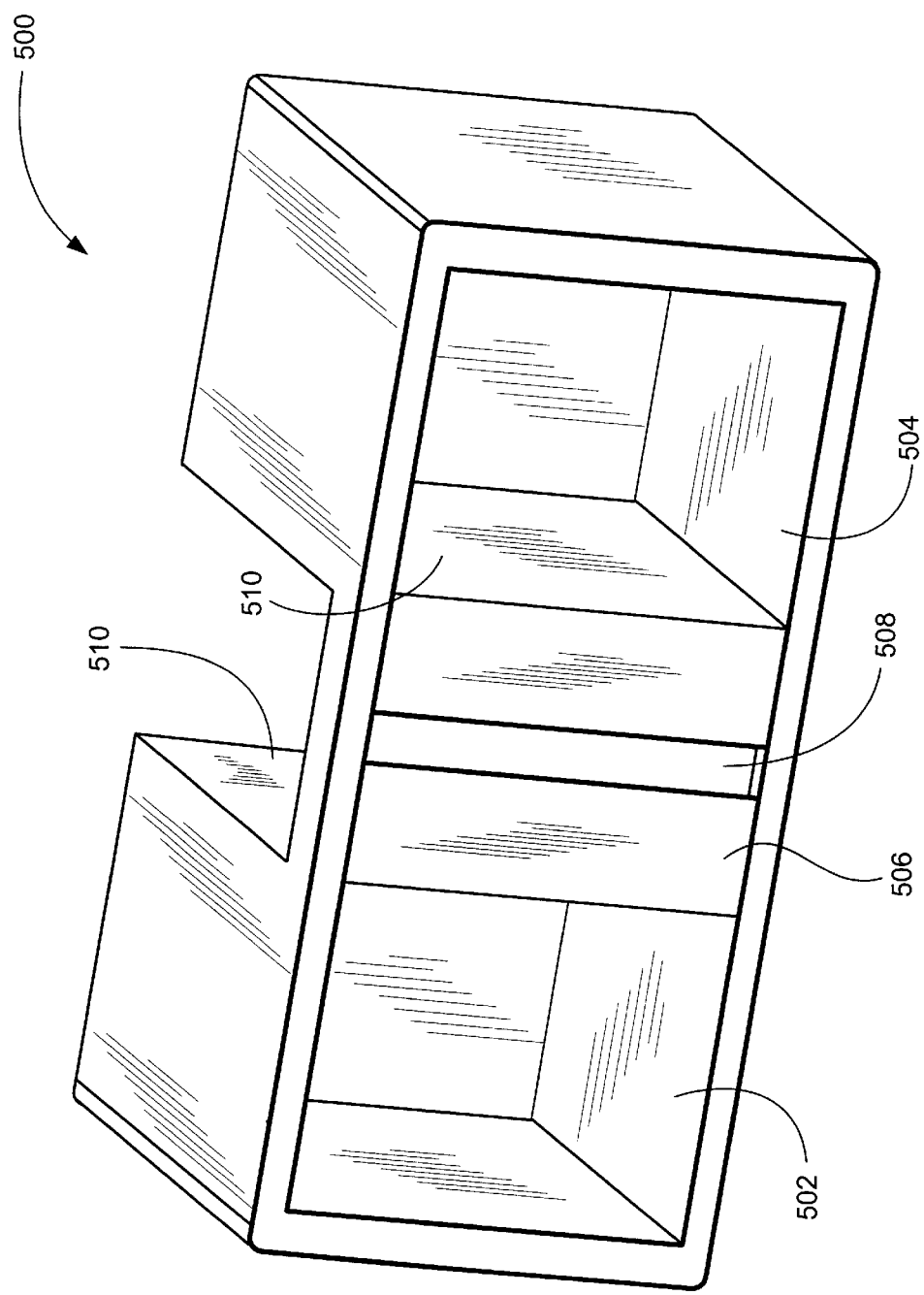

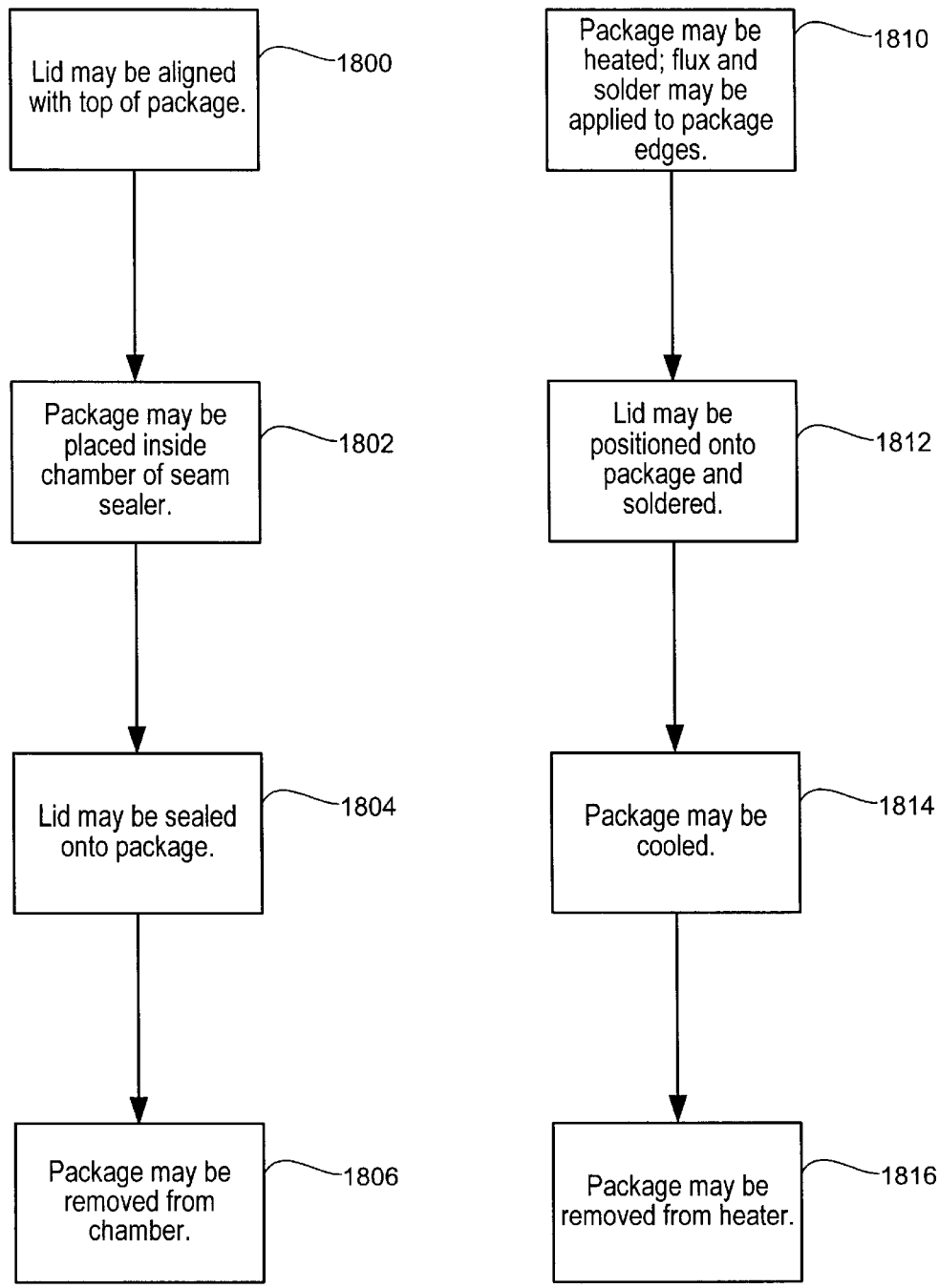

APPARATUS AND METHOD TO METALLIZE, REINFORCE, AND HERMETICALLY SEAL MULTIPLE OPTICAL FIBERS

CROSS-REFERENCE TO RELATED APPLICATIONS

This is a continuation-in-part of U.S. patent application Ser. No. 09/654,459 filed on Sep. 1, 2000, now abandoned, which is incorporated herein by reference in its entirety.

FIELD OF THE INVENTION

This invention relates generally to an apparatus and method to connect multiple optical fibers to a package, and more specifically to an apparatus and method to metallize optical fibers, reinforce metallized optical fibers, and hermetically seal the connection of metallized optical fibers to a package.

BACKGROUND OF THE INVENTION

In many optical and electro-optical and optical packages and systems (e.g., computer systems, programmable electronic systems, telecommunication switching systems, control systems, and so forth) the reliable connection of multiple optical fibers to a package is desired, but difficult to achieve due to the fragile nature of the optical fibers and the water permeability of the polymer coating (e.g., urethane acrylate and equivalent polymers) surrounding each optical fiber. The migration of water into a package through the polymer coating surrounding each optical fiber has a detrimental effect on the operation and reliability of the components inside the package.

One solution for connecting one or more optical fibers to a package is to remove the polymer coatings surrounding each optical fiber and coat the bare optical fiber with a solderable metal, such as nickel or lead-tin solder. Then each optical fiber is soldered into an opening of a package with sufficient solder to completely seal the optical fiber opening of the package. Prior art solutions are typically addressed to metal-coating each optical fiber on the very end of a bare optical fiber, one at a time.

However, this process introduces several new problems. One problem is that the optical fiber becomes very brittle and easy to break after the polymer coating is removed, since the polymer coating supplied mechanical support to the optical fiber. Another serious problem is created when the optical fiber is coated with a solderable metal, because the thermal shock of being coated with hot metal frequently degrades the optical and mechanical properties of the optical fiber. Furthermore, it is usually necessary to deposit multiple metal-coatings (creating multiple thermal shocks) on an optical fiber to achieve sufficient metal adhesion to the optical fiber. Additionally, it is extremely difficult to solder individual metal-coated optical fibers to package openings without breaking off the weakened metal-coated end of the optical fiber. Finally, it is also extremely difficult to solder multiple individual metal-coated optical fibers one-at-a-time, without the previously soldered optical fibers coming loose and shifting in position. Since the positioning of optical fibers is extremely critical to the optical coupling efficiency of the connection, even a shift between an optical fiber and a component exceeding 0.5 micron can be detrimental to the operation of an optical or electro-optical device.

FIG. 1 illustrates one approach for handling package connections in an electro-optical or optical system 100. Electro-optical system 100 shows an example of package 102 with ribbon cable 104 conventionally routed into the package 102 through opening or junction 106. FIG. 2A shows an example of a cross section of an individual fiber 200 from ribbon 104 in cross-section 2A—2A from FIG. 1. As seen in a conventional assembly, individual fiber 202 may be typically surrounded by polymer coating 204 that is coated with a metal sleeve 206 and soldered into a wall at junction 106 of package 102. Polymer coating 204 may provide a path for the migration of water into package 102 and the eventual failure of components within electro-optical system 100. If coating 204 were removed from optical fiber 202, optical fiber 202 may become extremely brittle and easy to break during the process of soldering metal sleeve 206 to package 102.

Even if every opening is properly sealed by solder, the fragility of the optical fibers 202 near the soldered connections and the lack of mechanical reinforcement make it easy to break the optical fibers 202 when forces are imparted to the ribbon 104. The prior art metallization on the end of an optical fiber makes it difficult to mechanically clamp or reinforce the optical fiber near the soldering point. Mechanical clamping and reinforcement would be greatly facilitated by the extension of each optical fiber into a package. This would allow the optical fiber and package opening to be soldered some distance away from the end of the optical fiber. Then clamping and reinforcement could support the optical fiber on the outside of the package opening, as well as support the optical fiber on the inside of the package opening.

Furthermore, most optical and electro-optical systems may require several groups of optical fibers (e.g., bundled in ribbons of optical fibers) connected to one or more packages. The conventional method of connecting separate optical fibers to a package also has the disadvantage of requiring several package openings. Each package opening provides another point of entry for water into the package. Therefore, it would be preferable to minimize the number of package openings by connecting multiple optical fibers through one package opening to the components inside the package.

It would also be desirable to have the capability to selectively metallize multiple optical fibers in a bundled configuration along any segment of the bundle without breaking the optical fibers. The selective metallization would make it easier to reliably connect multiple optical fibers in a bundled (e.g., ribbon or cabled) configuration to a package using solder to seal the package opening to avoid moisture and gas migration into the package. It would also be desirable to provide an apparatus and method to reduce the stress on metallized optical fibers created by hermetically sealing the connection of metallized optical fibers to a package.

SUMMARY OF THE INVENTION

It is difficult to route optical fibers through a package opening for a component package. In such a case, metallized fibers may be used at the junction point where the fibers extend through the package wall to aid in sealing the package. However these fibers become very fragile and easy to break. Accordingly, apparatus and methods to metallize, reinforce, and hermetically seal multiple optical fibers are described herein.

A ribbon of optical fibers ranging from one to several dozen individual fibers may be placed into a fixture as described herein which preferably exposes only a select portion of the mid-span segment. The exposed portion may correspond to the geometry of the length of the ribbon segment to be stripped and metallized, as described below. The exposed segment of ribbon may be stripped of polymer coatings surrounding each of the individual fibers through a variety of methods, preferably by acid etching or alternatively by laser etching, etc. Then, a variety of metallic coatings may be deposited onto the bare segment of the optical fibers, preferably while the ribbon is still disposed within the fixture. The metallic coatings may comprise one to several layers, e.g., an adhesion layer, a solderable layer, and a protection layer.

Once metallized, the segment of optical fibers may then be positioned onto a metallic plate and soldered onto the plate for reinforcement of the metallized segment. Epoxy may additionally be deposited onto the fibers and plate to further affix the assembly. The plate and metallized segment may then be fed through a package opening. Once properly positioned within an opening, flux and additional solder may be melted around the gap defined between the plate and fiber assembly and the package opening. In addition to the solder, epoxy may also be applied over the solder to help protect the solder and additionally seal the package. This may result in a hermetic seal of the package preferably having a package leak rate less than about, e.g., $10^{-9}$ AtmCC/sec (air) which is lower than an industry Mil-spec. standard of $10^{-6}$ AtmCC/sec (air). The hermetic seal may also provide protection of the package interior from marine and salt environments.

Accordingly, part of the present invention may provide for the capability to selectively metallize multiple optical fibers in a ribbon configuration along any segment of the ribbon without breaking the optical fibers. It also may provide for the capability to reliably connect multiple optical fibers in a ribbon configuration to a package using solder to seal the package opening to avoid moisture and gas migration into the package. Also, stress on metallized optical fibers created by hermetically sealing the connection of metallized optical fibers to a package may be reduced.

Advantages of the invention will become apparent to those skilled in the art from the following detailed description of the invention and the accompanying drawings.

BRIEF DESCRIPTION OF THE DRAWINGS

FIG. 2B illustrates cross-section 2B/2C—2B/2C of the ribbon from FIG. 1.

FIG. 2C illustrates a variation of cross-section 2B/2C—2B/2C of the ribbon from FIG. 2B.

FIG. 5 illustrates an isometric view of another variation on the fixture.

FIG. 18A shows a flow chart for an alternative method for sealing a lid to the package preferably after the package openings are sealed.

FIG. 18B shows a flow chart for another method for sealing a lid to the package preferably after the package openings are sealed.

DETAILED DESCRIPTION OF THE INVENTION

Figure 1:
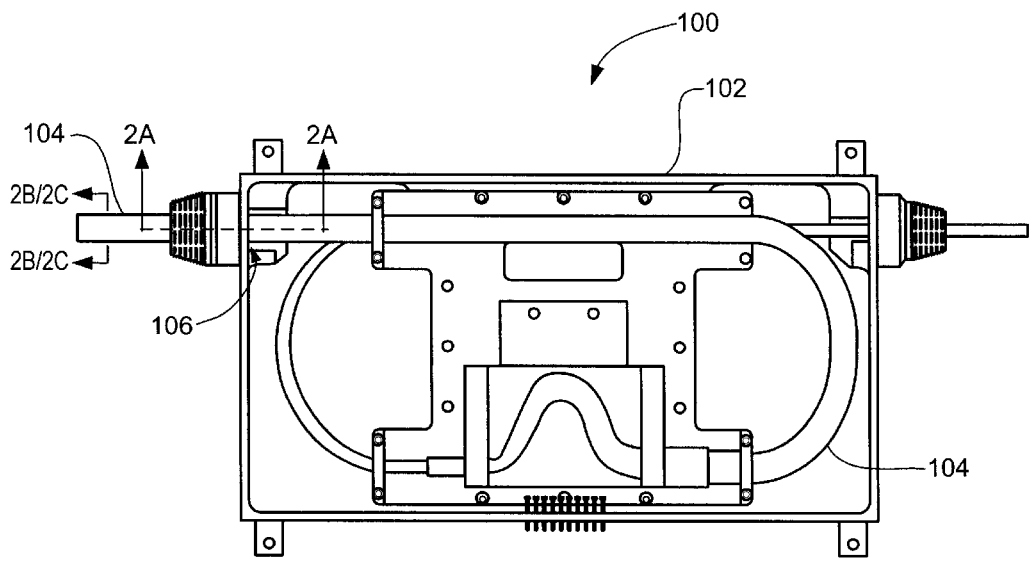
FIG. 1 illustrates a prior art approach for handling package connections in an electro-optical system.
Figure 2A:
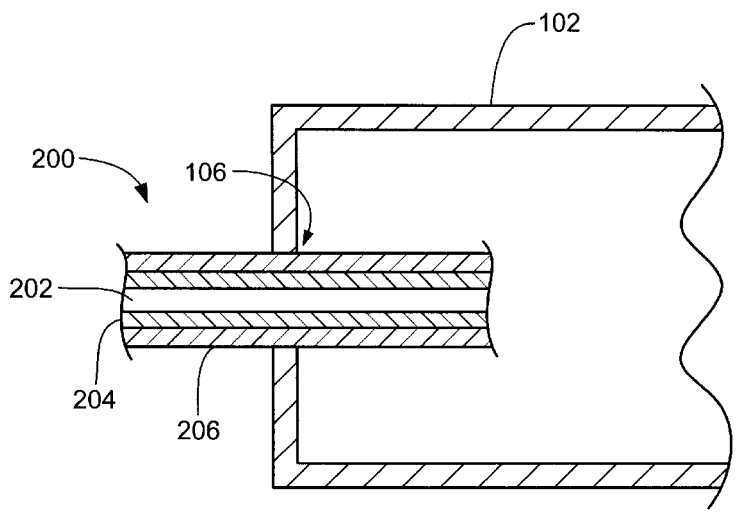
FIG. 2A illustrates cross-section 2A—2A of an individual fiber of the ribbon from FIG. 1.

This invention provides an apparatus and method to metallize, reinforce, and hermetically seal a package connected to optical fibers. In one variation of the invention, a segment of, e.g., a ribbon of multiple optical fibers, may have its coating stripped away prior to the metallization of each optical fiber. FIG. 2B shows a variation on the cross-section 2B/2C—2B/2C of ribbon 104 from FIG. 1. Although fibers 200 may be routed individually, several optical fibers 200 may be optionally packaged together, as shown, such that they may be held adjacent to one another to form a ribbon 104. As seen in the example, the cross-section may comprise four fibers 200 held together by an encapsulating material 208, e.g., clear urethane acrylate. The ribbon 104 may have a resulting thickness, $t_1$ (e.g., about 310 microns), and a resulting width, $w_1$ (e.g., about 1060 microns), and it may also have a uniform core-to-core distance, $d_c$, (e.g., about 254 microns). Such ribbons may be obtained from Corning Cable Systems of Hickory, N.C.

An alternative variation 104' of cross-section 2B/2C—2B/2C is shown in FIG. 2C where two separate ribbons from FIG. 2B may be juxtaposed to create a multiple fiber ribbon, in this case, an eight fiber ribbon having a resulting thickness, $t_2$ (e.g., about 320 microns), and a resulting width, $w_2$ (e.g., about 2150 microns), with a core-to-core distance between adjacent ribbons of $d_r$ (e.g., about 275 microns). Separate ribbons may be held together by another multiribbon encapsulating material 210, e.g., silicone acrylate. In further alternative variations, multiple optical fibers may be bundled in configurations other than a ribbon. Regardless of the configuration, it is preferable to metallize a segment of optical fibers within a bundle, e.g., a ribbon, that is located at some distance away from either end of the optical fibers.

Decapsulation and Metallization

Figure 3:
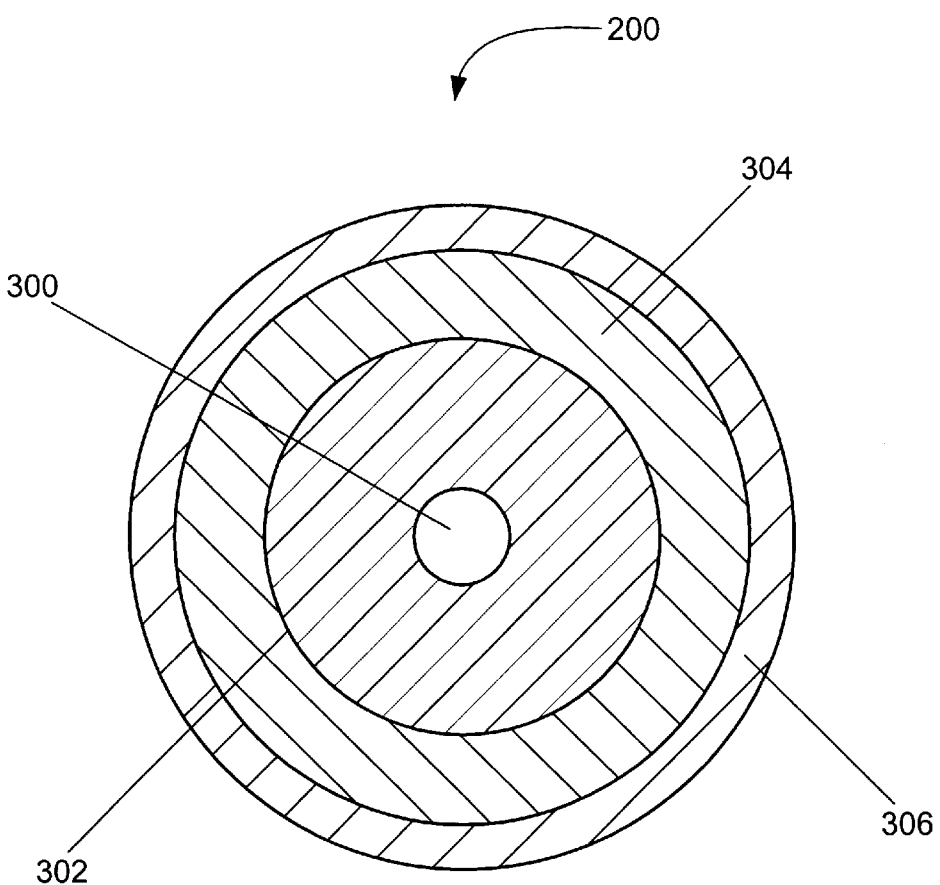
FIG. 3 illustrates a typical cross-section of an optic fiber prior to stripping and metallization.

A cross-section of fiber 200 is shown in FIG. 3 prior to stripping and metallizing. Fibers 200 may have an optical fiber, typically made of a material such as $SiO_2$, defined by fiber outer diameter (OD) 302 and fiber core 300. Fiber core 300 may have a diameter of about 9.3 microns and fiber OD 302 may have a diameter of about 125 microns and both may have an elastic modulus of about 72.4 MPa. Surrounding the optical fiber OD 302 may be inner primary layer 304 and a further layer atop primary layer 304 may be secondary layer 306. Primary layer 304 may have a diameter of about 190 microns and an elastic modulus of about 1.7 MPa while secondary layer 306 may have a diameter of about 245 microns and an elastic modulus of about 580 MPa. If secondary layer 306 is optionally colored, the diameter may be slightly larger with a range of about 250 to 252 microns. Both primary layer 304 and secondary layer 306 may be made of a material such as UV-cured acrylate.

Figure 4A:
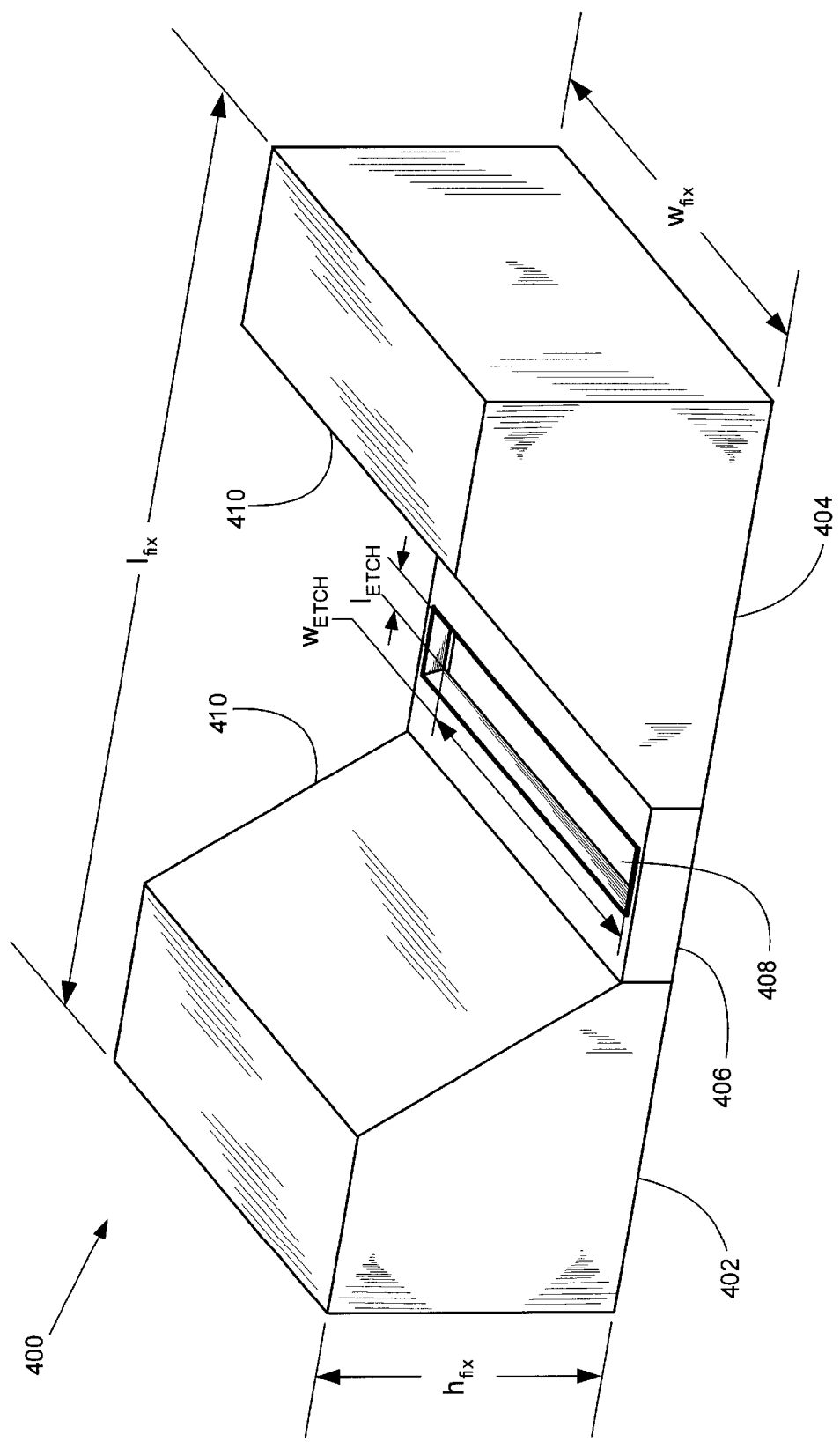
FIG. 4A illustrates an isometric view of a variation on a fixture which may be used to hold a ribbon of optic fibers for stripping and metallization.
Figure 4B:
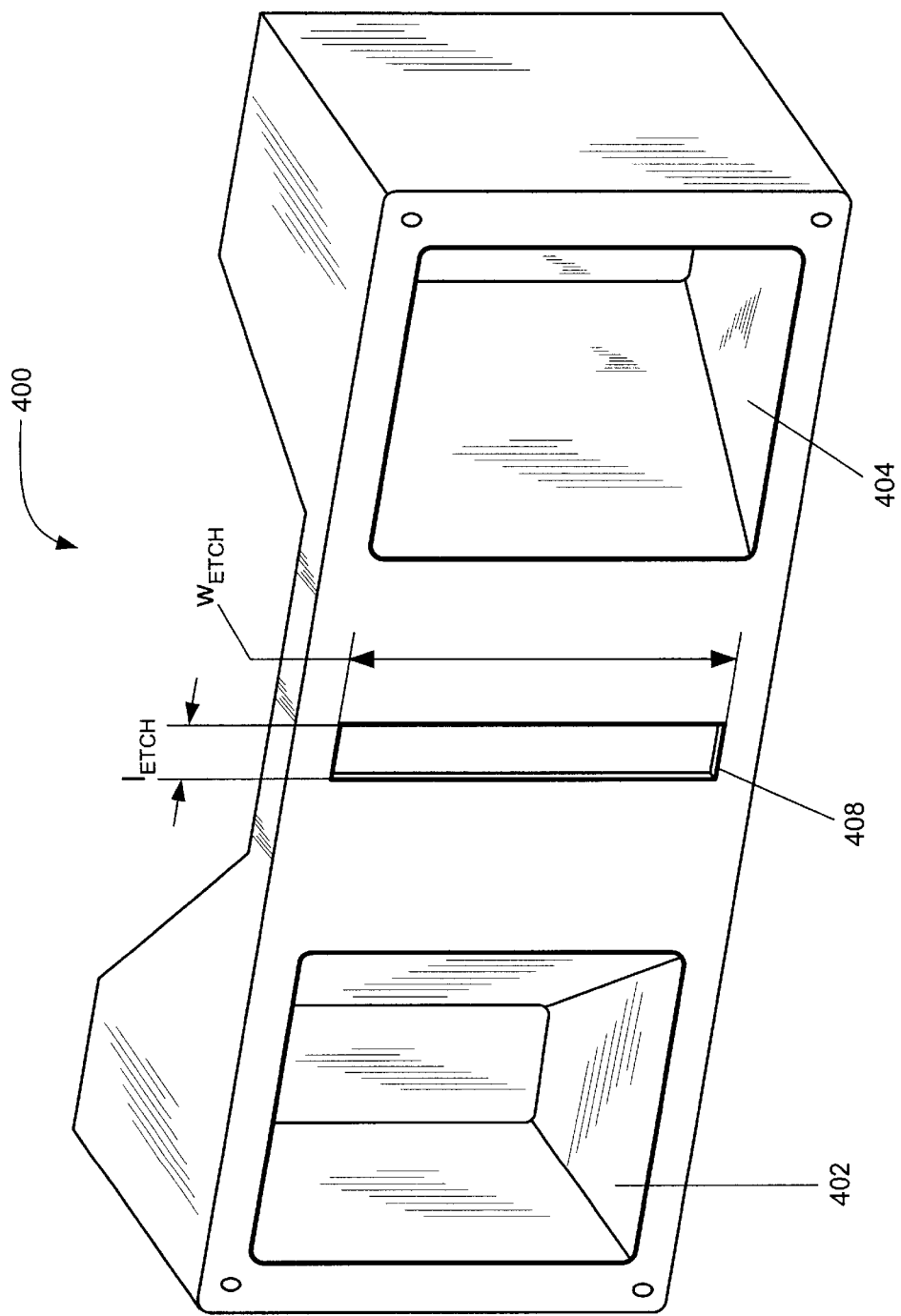
FIG. 4B illustrates a reverse isometric view of the fixture from FIG. 4A.

FIG. 4A illustrates an isometric view of a variation on a fixture which may be used in stripping segments of fibers, e.g., ribbons 104 or 104'. Fixture 400 may have first receptacle 402 and second receptacle 404 held together by bridging member 406, which may have etching slot 408 defined along a length of member 406. Fixture 400 may comprise a length, $l_{fix.}$, a width, $w_{fix.}$, and a height, $h_{fix.}$, and a pair of opposing angled walls 410. An example of fixture 400 measurements may have $l_{fix.}$ at about 10.25 in. (26.04 cm), $w_{fix.}$ at about 6.25 in. (15.88 cm), and $h_{fix.}$ at about 3.1 in. (7.87 cm). A length of ribbon which may be wound, e.g., in a spool, may be held within receptacles 402, 404 with a portion to be stripped preferably held along bridging member 406. The desired segment for stripping is preferably held such that the segment lies exposed across etching slot 408. Etching slot 408 may have a length, $l_{ETCH}$, which preferably corresponds to the length of the fiber ribbon to be stripped. Furthermore, a width of slot 408, $w_{ETCH}$, also preferably corresponds to a maximum width of a fiber to be stripped. FIG. 4B shows a reverse isometric view of the variation of fixture 400 shown in FIG. 4A. A length of ribbon may be held in receptacles 402, 404 with the segment to be stripped held over slot 408. Gaskets (not shown) may be placed over the openings of receptacles 402, 404 and atop bridging member 406 to prevent the exposure and stripping of other sections of ribbon. The ends of the ribbon may be spooled into the receptacles to avoid metal coating. Alternative embodiments of the fixture may allow some metal coating coverage to extend either slightly less than the length of the bare segment or slightly more than the length of the bare segment.

FIG. 5 illustrates an isometric view of another variation for a fixture with fixture 500. The fixture 500 may likewise have etching slot 508 to allow etchant deposition on both sides of a segment of optical fiber ribbon, and first receptacle 502 and second receptacle 504 to contain wound-up lengths of the optical fiber ribbon. Preferably, as above, a segment of optical fiber ribbon may be attached to bridging member 506 over etching slot 508 to allow the removal of the polymer coating. Then fixture 500 and ribbon (not shown) may be placed in a metal deposition chamber without disturbing the fragile bare segment of ribbon for metal coating the segment of the ribbon. This variation shows opposing walls 510 as being parallel, but they may range in a variety of angles, as in fixture 400, depending upon the application.

The fixture is preferably made from a non-ferrous (non-magnetic) metal or metal alloy which may also allow for easy machining, e.g., aluminum or aluminum alloy. Alternative embodiments may have fixtures comprised of non-metallic materials, e.g., ceramics or glass. A non-magnetic material is preferably chosen to fabricate the fixture because the metal deposition process is preferably performed inside a radio-frequency plasma-sputtering chamber, but other types of metal deposition (e.g. evaporative deposition) may alternatively be used to coat the optical fibers.

In operation, the fixture, e.g., fixture 400, with an exposed segment of ribbon within etching slot 408 may be stripped by, e.g., conventional laser systems. Alternatively, an ablative chemical, e.g., sulfuric acid, may also be used for stripping by heating the chemical to a temperature between about 100° to 250° C. Chemical stripping may be performed by using systems used to decapsulate semiconductor plastic packages; for example, the exposed segment of ribbon may have the hot acid poured over it or sprayed onto it in an acid jet for an etch time of about 15 to 300 seconds, depending upon the exposed fiber type and length. The exposed segment of ribbon may be held between plates made, for instance, from plastic having openings to accommodate the exposed segment of ribbon. When compared to fiber 200 of FIG. 3, primary and secondary layers 304, 306 are preferably removed to leave fiber core 300 and fiber OD 302 as a bare fiber. Following the etching procedure, the exposed fibers may be rinsed by, e.g., hot de-ionized water, to neutralize the acid and to remove acid which may have crept in-between the fibers. The fixture or decapsulating system itself may be further washed in de-ionized water to remove any residual acid.

Following the stripping procedure, a metallization procedure may be employed to metallize the stripped mid-span fibers. Metallization of fibers may enable the fibers to be soldered to a package to help provide a hermetic seal with a maximum leak rate of $10^{-9}$ AtmCC/sec (air), as described in greater detail below. The metallization may be performed by, e.g., either sputtering or by evaporation processes. Radio-frequency plasma-sputtering deposition chambers are available from MRC, with corporate headquarters located in Orangeburg, N.Y., CHA Industries, with corporate headquarters located in Fremont, Calif.; and System Control Technology, with corporate headquarters located in Livermore, Calif. Evaporative deposition chambers are available from Airco Temescal, with corporate headquarters located in Fairfield, Calif.; Balzers, with corporate headquarters located in Liechtenstein; and System Control Technology, with corporate headquarters located in Livermore, Calif.

If necessary, the fixture, e.g., fixture 400 or 500, containing the optical fibers may be flipped over or rotated about 180° in a metal deposition chamber so that the remaining half circumference of each optical fiber is coated to obtain a substantially uniform metal coating thickness around the entire circumference of each optical fiber. A preferable fixture may allow for some overlap of metal deposition beyond the segment of bare optical fibers, but minimizes the stress on the optical fibers during movement of the fixture, in order to minimize the breakage of the metallized fibers.

Metallization of the fibers may be performed by the deposition of a three layer metal coating onto the bare fiber.

Figure 6:
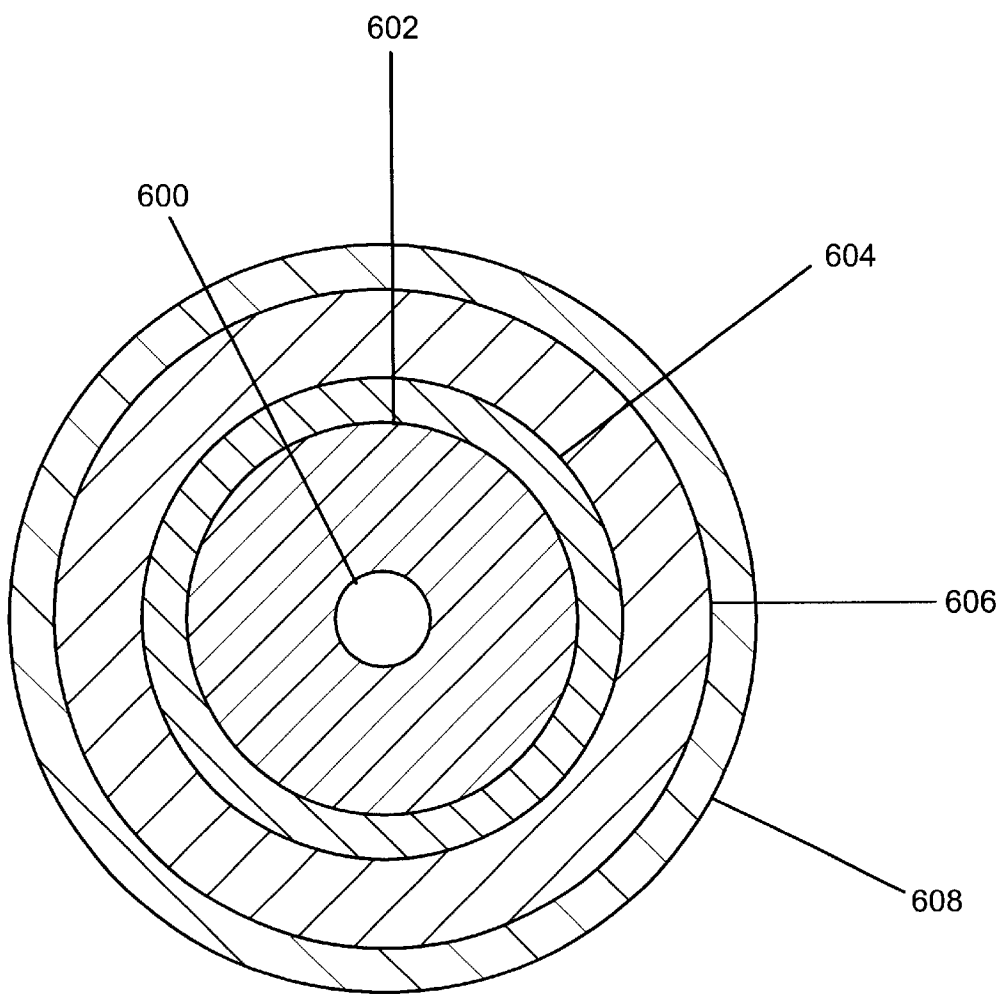
FIG. 6 illustrates a cross-section of an optic fiber after the stripping and metallization procedure.

As shown in FIG. 6, the cross-section of fiber 200 from FIG. 3 is shown after being stripped or decapsulated and metallized. Fiber core 600 has fiber OD 602 defined around it. Next, metallic adhesion layer 604 is preferably disposed on top of fiber OD 602, and preferably next is solderable layer 606 disposed on top of adhesion layer 604, and preferably surrounding solderable layer is metallic protection layer 608. Adhesion layer 604 may be used to adhere solderable layer 606 to the glass of fiber OD 602 and protection layer 608 may serve a dual purpose. One purpose may be to allow for wetting of the fiber and another purpose may be to prevent the oxidation of solderable layer 606. As such, examples of metals used for adhesion layer 604 may comprise Titanium and Chrome; examples of metals used for solderable layer 606 may comprise Nickel and Copper; and examples of metals used for protection layer 608 may comprise Gold, Silver, Indium and Silver-Palladium alloy. Examples of the metals may be used in any combination with one another.

A preferable metal coating deposition sequence on a segment of bare optical fibers may be a three layer metal coating of Titanium, then Nickel, and an outer coating of Gold. Titanium may be used for adhesion layer 604 to the optical fiber OD 602. Nickel may be applied over the layer of Titanium for solderability, and Gold may be applied to protect the solderability of the layer of Nickel. In an alternative deposition sequence, the metal coating deposition sequence may be Chrome for adhesion layer 604, then Copper for the solderable layer 606, and an outer coating 608 of Gold for solderability protection of the Copper layer. Another alternative may use a deposition sequence of Titanium, Nickel, and Silver; a deposition sequence of Titanium, Nickel, and Indium; or a deposition sequence of Titanium, Nickel, Silver alloyed with Palladium. Alternative metal coating deposition sequences and thinner metal thicknesses are feasible with the present invention. Table 1 lists some of the approximate thickness ranges and preferred metal coating thicknesses and deposition sequences of metal coatings on the bare optical fibers. As seen in the Table below, (1) refers to adhesion layer 604, (2) refers to solderable layer 606, and (3) refers to protection layer 608. The thicknesses are merely illustrative and are not meant to limit the present invention in any way.

TABLE 1

Possible variations of metal coating deposition sequences and thicknesses.

| Layer | Metal | Thickness Range (Angstroms, Å) | Preferred Thickness Range (Angstroms, Å) |
|---|---|---|---|
| 1 | Titanium | 50–5,000 | 250–1,000 |
| 2 | Nickel | 500–20,000 | 500–10,000 |
| 3 | Gold | 500–20,000 | 500–10,000 |
| 1 | Chrome | 150–5,000 | 250–1,000 |
| 2 | Copper | 500–20,000 | 2500–10,000 |
| 3 | Gold | 500–20,000 | 500–10,000 |
| 1 | Titanium | 50–5,000 | 250–1,000 |
| 2 | Nickel | 500–20,000 | 500–10,000 |
| 3 | Silver | 500–20,000 | 500–10,000 |
| 1 | Titanium | 250–5,000 | 250–5,000 |
| 2 | Nickel | 500–20,000 | 500–10,000 |
| 3 | Indium | 500–20,000 | 500–15,000 |
| 1 | Titanium | 250–5,000 | 250–5,000 |
| 2 | Nickel | 500–20,000 | 500–10,000 |
| 3 | Silver/Palladium | 500–20,000 | 500–15,000 |

Figure 7:
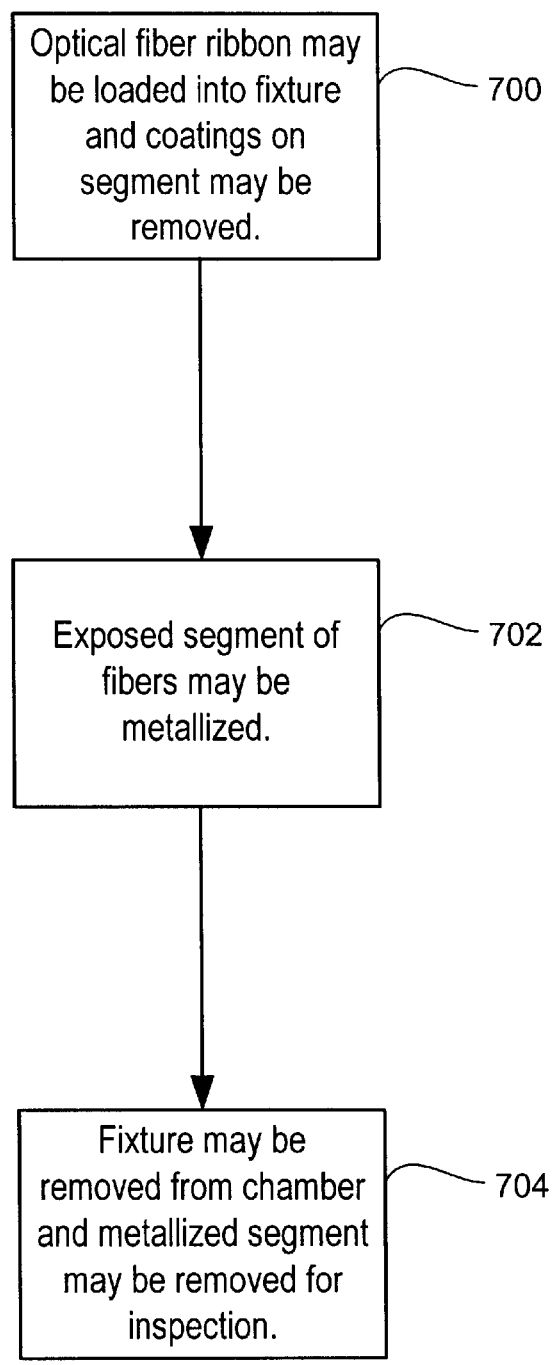
FIG. 7 shows a flow chart with a variation on the stripping and metallization procedure.

FIG. 7 shows an example of a flow chart of one variation for metallizing a segment of a ribbon of optical fibers. An example of a method for metallizing a segment of a ribbon of optical fibers may comprise first exposing the segment within a fixture to expose only the segment to be etched, etching that segment using any of the methods described herein, and then depositing at least one metal layer upon the etched segment. The method is described in further detail in operation 700 where the optical fiber ribbon may be attached to a fixture, e.g., fixture 400, in such a way that a segment of the ribbon is exposed on both sides by an opening, e.g., etching slot 408, in the fixture. Then the polymer coatings may be entirely removed from the segment, e.g., by acid etch, laser, reactive ion etch, plasma-sputtering, or an equivalent procedure. The same fixture may preferably be used to remove polymer from the ribbon segment as well as to deposit metal on the resulting bare segment. Then operation 702 may follow, where a first metal coating may be deposited by evaporation or sputtering, e.g., an adhesion layer of titanium, on a first side of the ribbon segment. The operation may be repeated where a second metal coating is deposited on the first side of the ribbon segment. Then a third layer of metal may be deposited on the first side of the ribbon segment in operation. The metals used for deposition may be any of the appropriate metals as described herein.

The fixture may be rotated or flipped about 180° over so that the operation 702 may be repeated for metal deposition on a second side of the ribbon segment. This may be done to deposit a uniform thickness of metal around the entire circumference of each optical fiber. At this point, three layers of metal may have been deposited on the first and second side of the ribbon segment so that the three metal coatings are almost uniform around the entire circumference of each optical fiber originally exposed in the ribbon segment. The method may then end in operation 704 where the fixture may be removed from the deposition chamber and the ribbon may be removed from the fixture for inspection.

Reinforcement Plate

Figure 8:
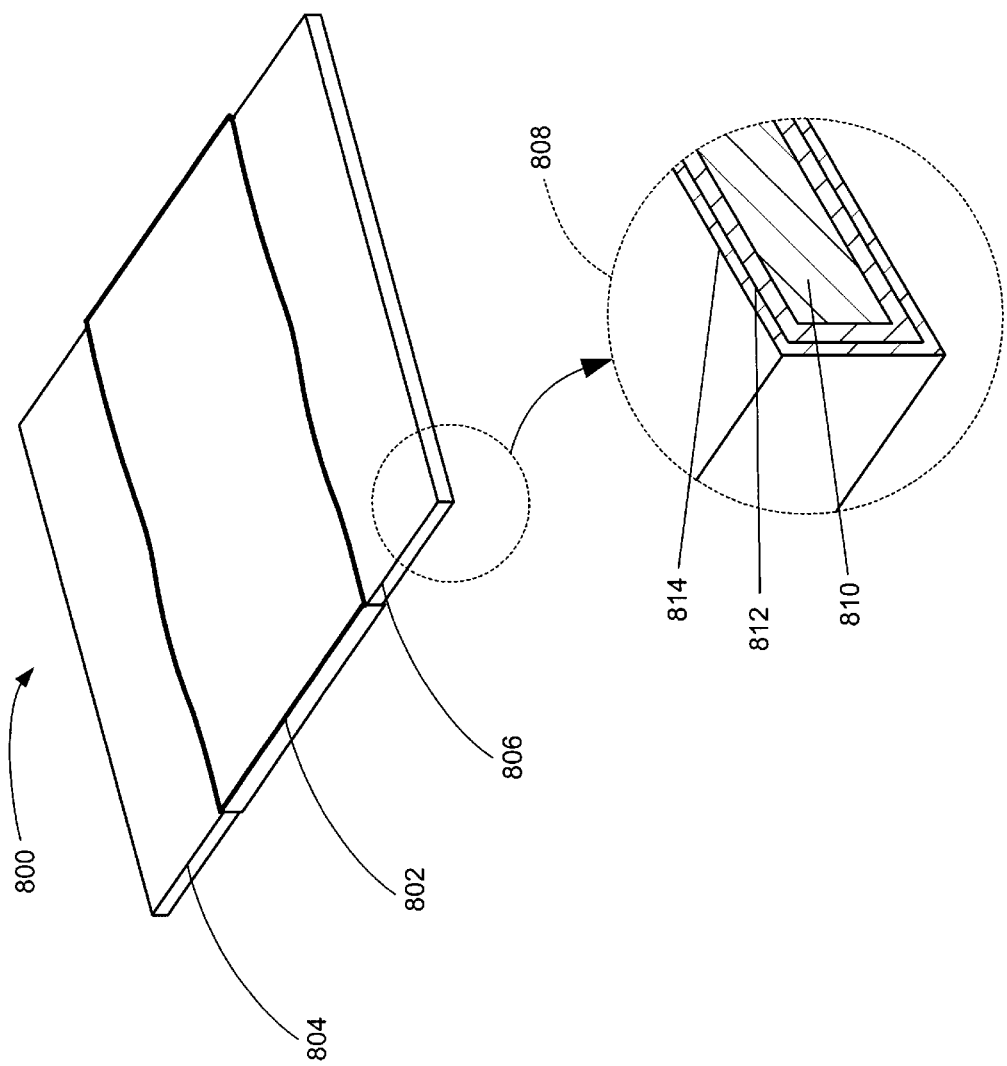
FIG. 8 illustrates a reinforcement plate with one solder-coated middle portion and two end portions without a solder coating, and additionally shows an expanded cross-section of the reinforcement plate to support the optical fibers.

Fibers by nature tend to be very fragile and after metallization, they may become even more brittle. After the metallization procedure described above, the fibers may need to be cleaned and packaged and if the fibers are not reinforced, they may be prone to breaking during such handling. Reinforcing the fibers with, e.g., a backing or reinforcement plate, may prevent such damage to the fibers. FIG. 8 illustrates an example of such a backing in reinforcement plate 800, which may have a solder-coated middle portion 802 where the fibers are preferably disposed and two end portions 804 and 806 without a solder coating. An expanded cross-section 808 of reinforcement plate 800 is also shown to illustrate a variation on a possible cross-section. The core 810 of reinforcement plate 800 may be fabricated from a metal, e.g., Kovar (30% nickel, 17% cobalt, and 53% iron). Alternatives may comprise other materials having a low coefficient of thermal expansion (CTE), e.g., Invar (36% nickel and 64% iron), Alloy 42 (42% nickel and 58% iron), Alloy 52, other low CTE metal alloys, and non-metallic materials, e.g., silicon, silicon wafers, quartz, ceramics, and glasses. Core 810 may be coated with, e.g., a Nickel under-layer 812 having a thickness of about 30 to 200μ-in. (0.762 to 5.080 microns), and under-layer 812 may then be coated with, e.g., a Gold outer-layer 814 having a thickness of about 10 to 100μ-in. (0.254 to 2.540 microns). Under-layer 812 may serve as a solderable layer, and outer-layer 814 may serve as a protection layer. Core 810 preferably has a thickness ranging from about 0.005 to 0.100 in. (0.0127 cm to 0.254 cm). The width of reinforcement plate 800 is preferably about 0.100 in. larger than a maximum width of the fiber array to be placed upon plate 800, e.g., a plate 800 width may be about 0.100 in. (0.254 cm) wider than a width, e.g., $w_1$ or $w_2$, from FIGS. 2B and 2C.

Kovar may be available from Williams Advanced Materials, with corporate headquarters located in Buffalo, N.Y.; Semi Alloys, with corporate headquarters located in Buffalo, N.Y., and Honeywell Electronic Materials, with corporate headquarters located in Spokane, Wash.

The middle portion 802 of the reinforcement plate 800 may be solder-coated between the two end portions 804 and 806 without a solder coating by coating or masking the two end portions 804 and 806 of reinforcement plate 800 with, e.g., Kapton tape, Mylar tape, an equivalent tape, or a water-soluble liquid solder mask. The middle portion 802 is preferably approximately equal in length to the length of the bare segment of the ribbon of optical fibers. The end portions 804 and 806 of the reinforcement plate 800 preferably have a length ranging from about 0.050 to 0.250 in. (0.127 to 0.635 cm).

It is preferable to use soldering flux to activate the middle portion 802 of the reinforcement plate 800 that is not masked. A preferable flux is a no-clean flux, but other fluxes may be used. In preferred embodiments, flux may be applied by either a brush or by dipping reinforcement plate 800 in flux.

After application of flux, the solder coating may be applied preferably by dipping reinforcement plate 800 in a solder pot and slowly withdrawing reinforcement plate 800 from the solder pot. Alternative variations of the invention could use a solder paste or some other application method to apply a substantially uniform solder coating. After the solder solidifies, the tape or mask may be peeled off or removed to leave the two end portions 804 and 806 without a solder coating. The two end portions 804 and 806 are preferably solder-free to provide a creep-free surface for epoxy deposition, as discussed below.

The solder-coated middle portion 802 of reinforcement plate 800 is preferably solder-coated with an Indium or Indium alloy solder. Indium solder may be available from Indium Corporation of America, with corporate headquarters located in Utica, N.Y. Indium solder is also available from Arconium, with corporate headquarters located in Providence, R.I. A preferable solder may use 99.99% pure Indium solder to coat reinforcement plate 800 and seal optical fibers to each package opening. However, alternative variations of the invention could use 99.9% pure Indium, 99% Indium, various alloys of Indium (including lead, silver, or palladium), or even alternative low temperature solder alloys of Bismuth, Lead, or Tin. Another variation of the invention uses 80% Indium, 15% Lead, and 5% Silver solder to coat the reinforcement plate 800 and seal optical fibers to each package opening. Another variation of the invention may use 97% Indium and 3% Silver solder to coat the reinforcement plate and seal optical fibers to each package opening. Another variation of the invention may use 95% Indium and 5% Bismuth solder.

Once reinforcement plate 800 is coated with solder, the metallized segment may be placed onto plate 800. Reinforcement plate 800 may be placed onto a hot stage, which is preferably maintained at a temperature of about 150° C.±25° C., and the metallized segment may be positioned over the hot stage (which will be discussed below) such that the stripped segment is preferably centered on reinforcement plate 800. A flux, e.g., no-clean flux, may be applied to the fibers and reinforcement plate 800 with, e.g., a brush. Either pure Indium solder or an Indium alloy solder may be melted, e.g., with a soldering iron, to cover the exposed fibers with the solder. Reinforcement plate 800 with the soldered fibers may then be removed from the hot stage and cleaned with chemicals, e.g., isopropyl alcohol and/or acetone. To further reinforce the fiber ends, an adhesive such as epoxy may be applied to the ends of reinforcement plate 800 over the fibers to eliminate handling damage to the glass fiber acrylate interface.

Figure 9:
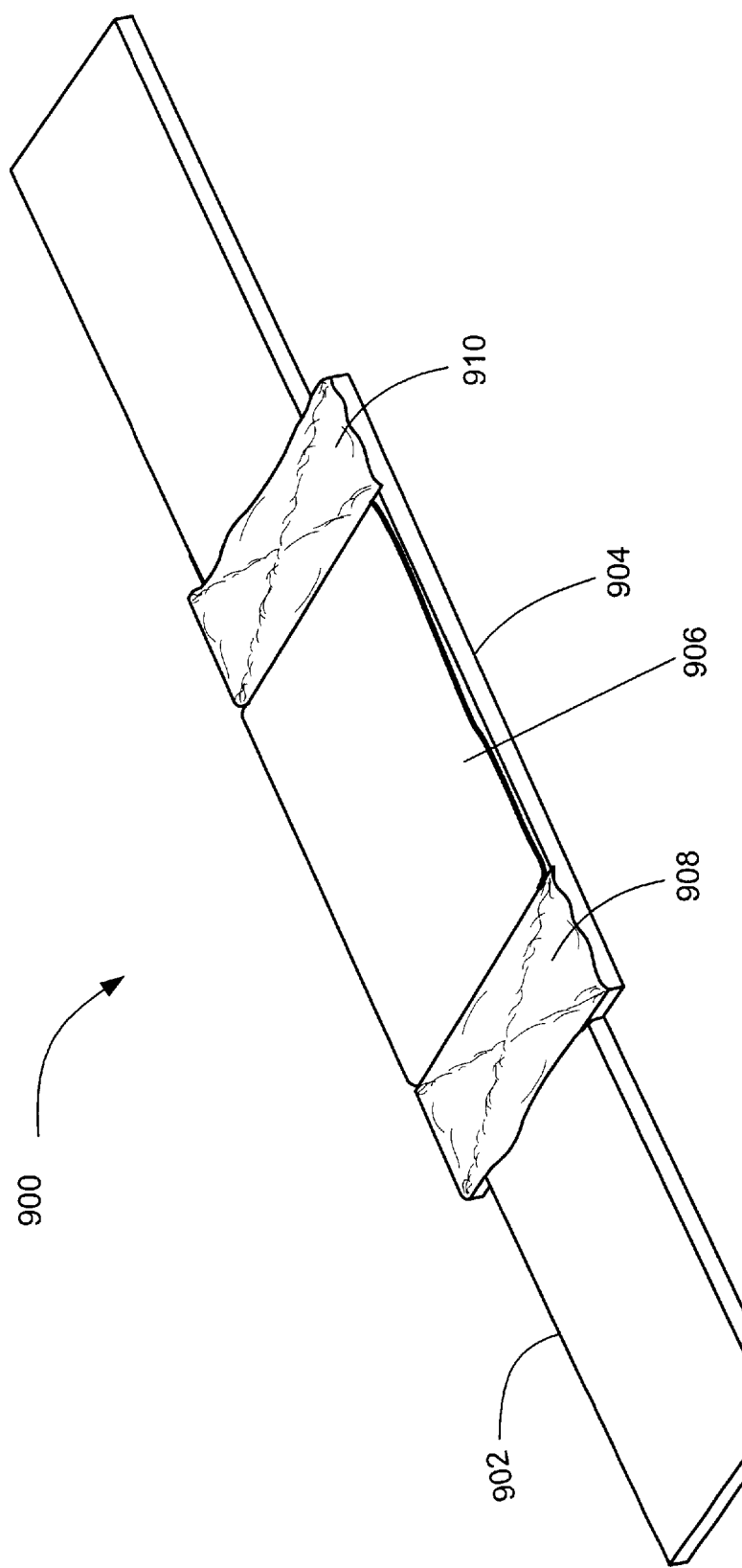
FIG. 9 illustrates an isometric view of a ribbon of optic fiber with a metallized segment soldered and epoxied onto a reinforcement plate.
Figure 10:
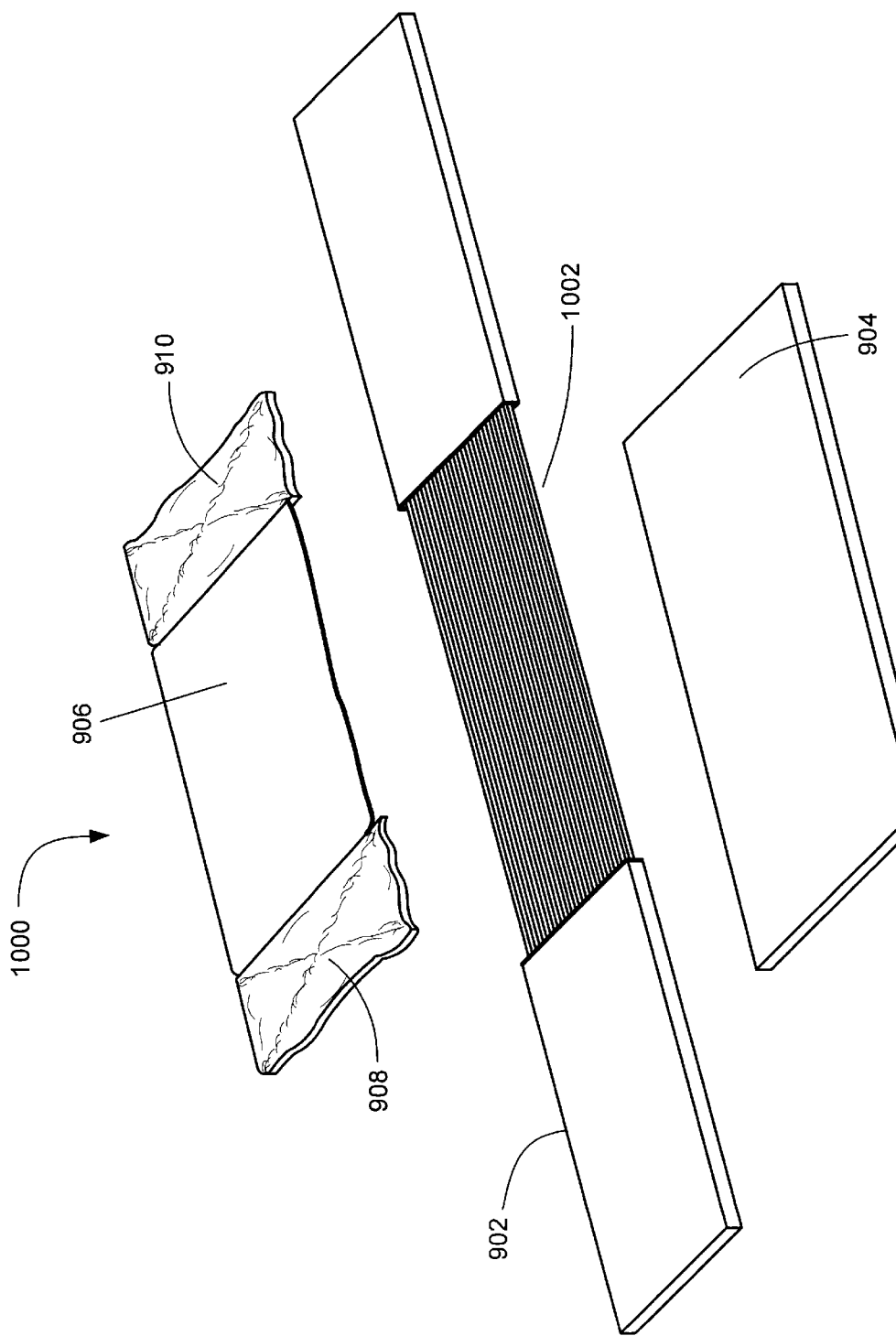
FIG. 10 illustrates an exploded assembly of the section from FIG. 9 showing the metallized segment for soldering onto the plate.

FIG. 9 shows an isometric view of section 900 reinforced by the process described above. As seen, a stripped and metallized segment of optic fiber ribbon 902 may be placed over solder-coated reinforcement plate 904. Covering the segment is solder 906 with epoxy depositions 908, 910 on both sides of solder 906 to cover the glass fiber acrylate interface. FIG. 10 illustrates an exploded view of section 900 from FIG. 9 in assembly 1000. As shown, metallized segment 902 of optic fiber ribbon 902 may be soldered to reinforcement plate 904. The metallized segment 902 may be soldered with solder 906 that preferably does not cover the fill length of reinforcement plate 904. This will leave enough area on the reinforcement plate 904 to attach nonmetallized lengths of ribbon 902 by epoxy depositions 908 and 910, preferably anhydride epoxy. A preferred epoxy is available from Dexter, with corporate headquarters located in City of Industry, Calif.; Namics, with corporate headquarters located in Tokyo, Japan; and Ablestik, with corporate headquarters located in Rancho Domingues, Calif. Alternative variations may use other types of epoxy or other adhesives, e.g., silicone compounds, polymer adhesives, and equivalents. The adhesive is preferably a thermally cured adhesive, but alternative variations may use an adhesive cured by ultraviolet light. A preferred epoxy dispenser may be available from EFD Dispenser, with corporate headquarters located in East Providence, R.I. However, other epoxy dispensers are available from other suppliers to dispense epoxy to implement the invention.

Figure 11:
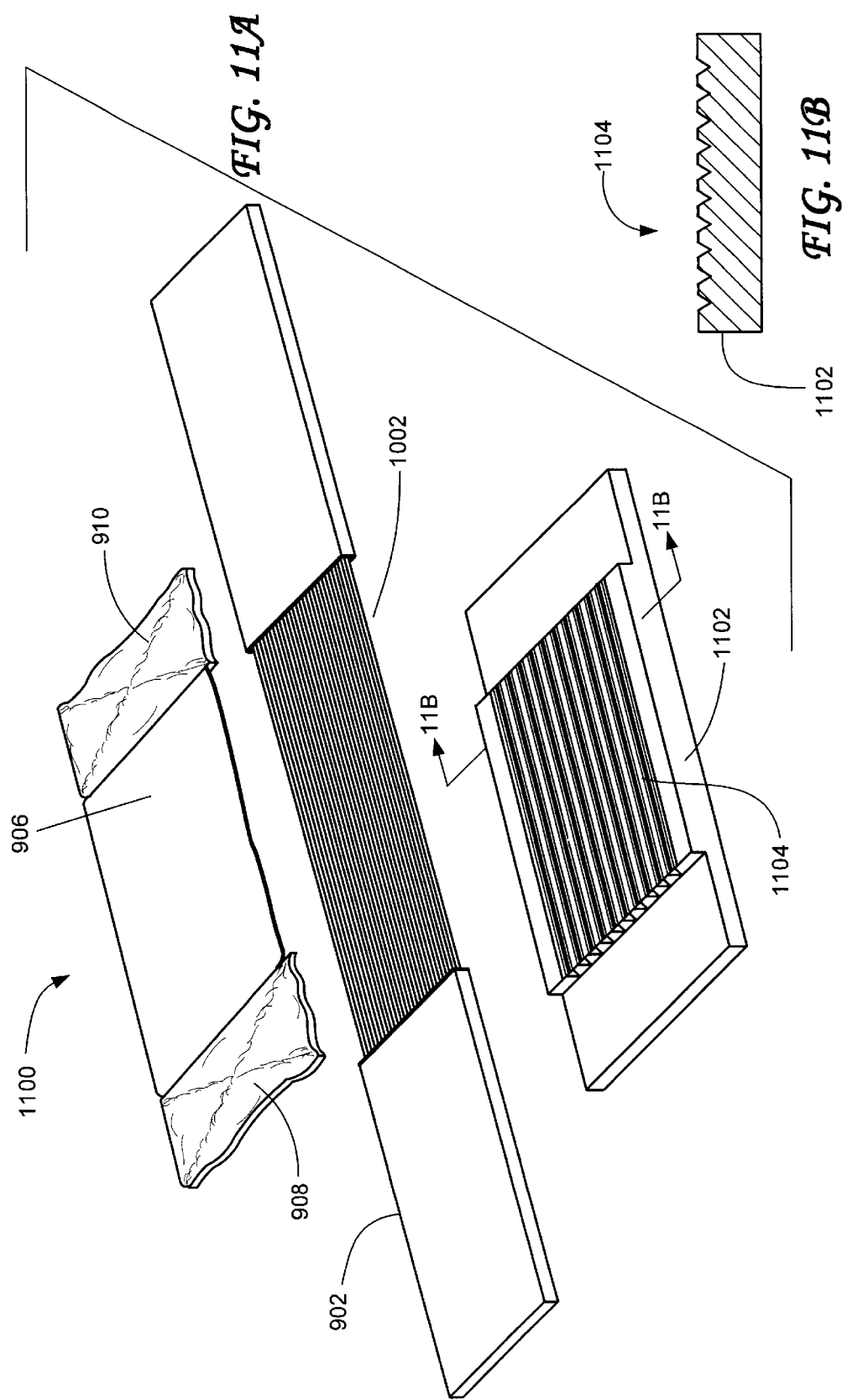
FIG. 11A illustrates an exploded alternative assembly of the section from FIG. 9 showing the plate having grooves.
FIG. 11B illustrates cross-section 11B—11B of the plate from FIG. 11A showing the grooves.

FIG. 11A illustrates another exploded variation 1100 using a reinforcement plate 1102 soldered to metallized segment 902 of a ribbon 902. The variation 1100 is similar to that shown in FIG. 10, but reinforcement plate 1102 optionally includes a portion 1104 etched or machined with metallized grooves, preferably in a V-shape, that may help prevent the shifting of each individual optical fibers in metallized segment 902 when it is soldered with, solder 906 to portion 1104. Preferably, portion 1104 does not extend the full length of the reinforcement plate 1102, as above, to leave enough unsoldered area on the ends of reinforcement plate 1102 to attach the ribbon 902 by epoxy depositions 908 and 910. Reinforcement plate 1102 and portion 1104 with V-grooves may be made of any of the materials described above. FIG. 11B shows cross-section 11B—11B from FIG. 11A to show an example of a cross-section with V-grooves 1104. The number of V-grooves 1104 may be determined by the number of individual optical fibers to be soldered to reinforcement plate 1102.

V-grooves 1104 are preferably metallized by processing through a variety of methods, e.g., electroless plating, electrolytic plating, sputter, or evaporation plating. Additionally, a variety of metallization schemes may be employed in metallizing reinforcement plate 1102 and portion 1104. Examples of metallization schemes may include the following as shown in Table 2.

TABLE 2

Possible variations of metal coating deposition sequences.

| No. | Sequence |
| --- | --- |
| 1 | Titanium/Nickel/Gold |
| 2 | Titanium/Nickel/Silver |
| 3 | Titanium/Nickel/Indium |
| 4 | Titanium/Nickel/Tin |
| 5 | Titanium/Nickel/Tin-Lead |
| 6 | Titanium/Nickel/Lead |
| 7 | Chromium/Copper/Gold |
| 8 | Chromium/Copper/Silver |
| 9 | Chromium/Copper/Indium |
| 10 | Chromium/Copper/Indium-Lead |
| 11 | Chromium/Copper/Tin-Lead |
| 12 | Nickel/Gold |
| 13 | Nickel/Silver |
| 14 | Nickel/Lead |
| 15 | Nickel/Tin |
| 16 | Nickel/Tin-Lead |

Once metallized, reinforcement plate 1102 and portion 1104 may be heated, e.g., by placement onto a heat block, to raise the temperature preferably close to the melting point of the solder used. Flux such as no-clean flux may then be applied to V-grooves of portion 1104 with, e.g., a brush. A solder, including any of the solders discussed herein, e.g., Indium or Indium alloy, may be applied to V-grooves 1104 while the fibers are disposed individually within each groove until all the fibers are preferably completely embedded in solder. Slight movement of the fibers along the axis of the V-grooves 1104 may assure proper wetting of the fibers. The whole assembly may be cooled by, e.g., blown air, and removal from the heater block. Flux residues may be cleaned by isopropyl alcohol and/or acetone, and the epoxy may be applied to the ends, as described above.

Figure 12:
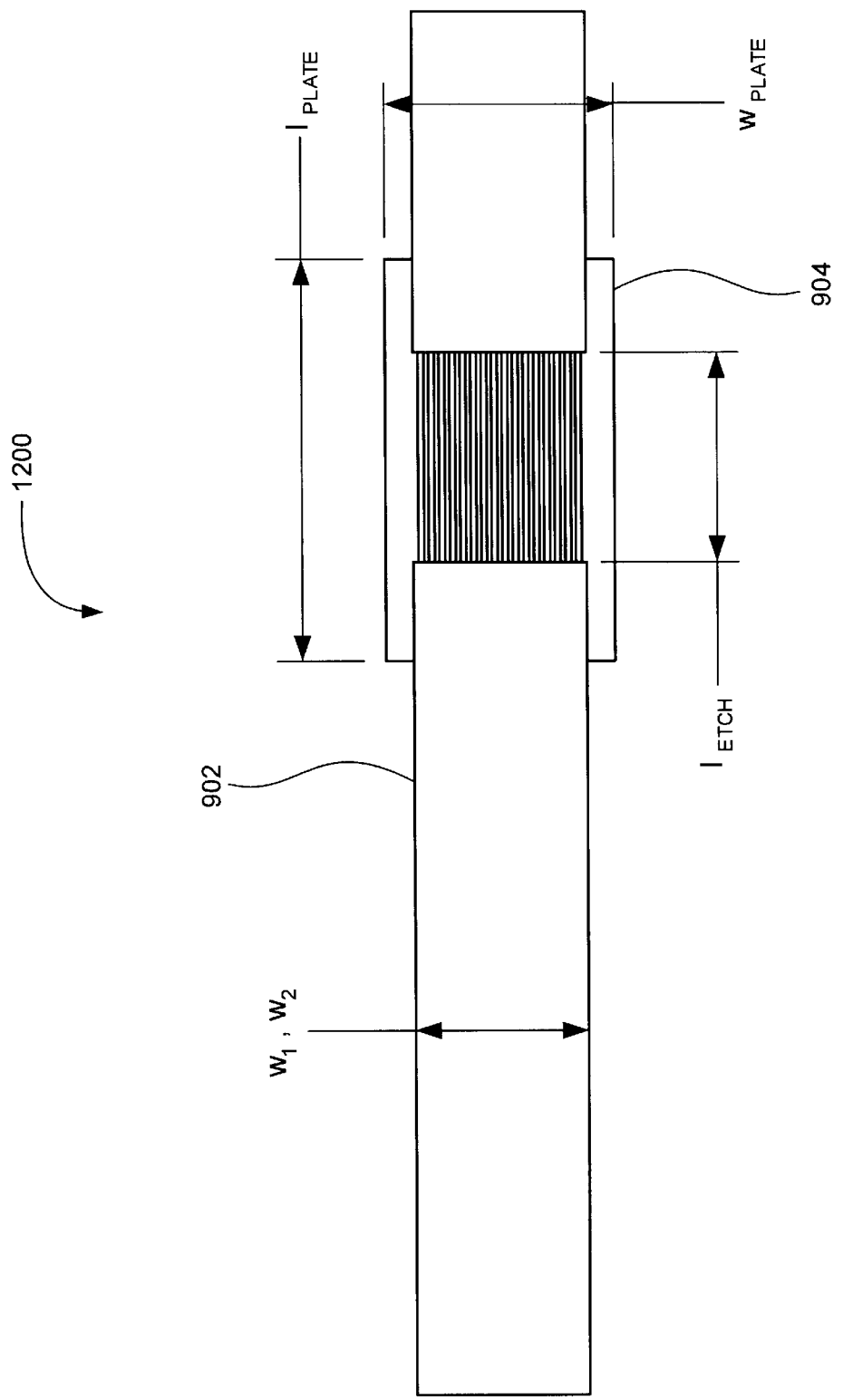
FIG. 12 shows a top view of the metallized segment positioned over the plate without solder or epoxy.

FIG. 12 shows a top view of stripped and metallized segment 1200 of optic fiber ribbon 902 placed atop reinforcement plate 904 with the solder and epoxy removed for clarity. As shown, the stripped segment length, $1_{ETCH}$, may correspond to the etching length of fixture 400 as shown in FIGS. 4A and 4B, which is shown as being between about 0.200 to 0.300 in. (0.508 to 0.762 cm). Ribbon 902 may have a width, $w_1$ or $w_2$, as in FIGS. 2B and 2C, or any width depending upon the ribbon and the number of fibers necessary or desired. Alternatively, its width may range from, e.g., an 8-fiber ribbon with a width of about 0.080 in. (0.203 cm), to, e.g., a 48-fiber ribbon with a width of about 0.240 in. (0.610 cm). Accordingly, the width, $w_{PLATE}$, of reinforcement plate 904 may range from about 0.160 in. (0.406 cm) to accommodate the 8-fiber ribbon to about 0.350 in. (0.889 cm) to accommodate the 48-fiber ribbon. The plate width, $w_{PLATE}$, may vary accordingly to the width of the ribbon 902. Segment 1200 with ranges are illustrated merely as examples and are not meant to limit the scope of the invention in any way.

Figure 13:
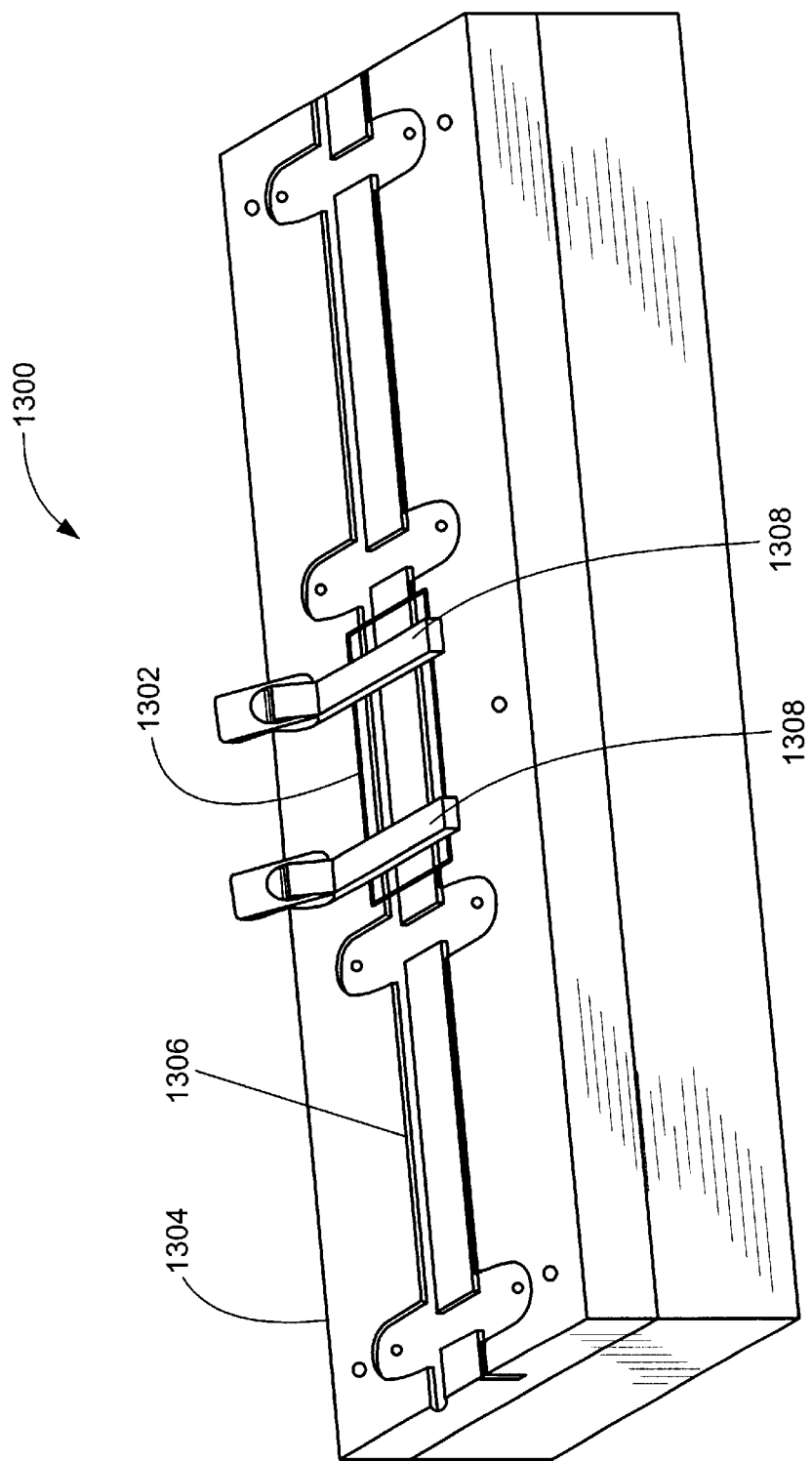
FIG. 13 illustrates an isometric view of a heater block which may be used for soldering a solder-coated reinforcement plate to a ribbon of optical fibers.

When heating the reinforcement plates to solder a solder-coated reinforcement plate (not shown) to a ribbon of optical fibers (not shown), as discussed above, heating block 1300 may be utilized as shown in FIG. 13 to optionally accommodate and align the assembly. Heater block 1300 may have a heated plate area 1302 just large enough to heat the reinforcement plate to melt the solder-coating on the reinforcement plate, a thermal insulator 1304, an alignment slot 1306, and clamps 1308. The heater block 1300 may be mostly covered by the thermal insulator 1304 to minimize the heating of the remainder of the ribbon of optical fibers. The alignment slot 1306 in the heater block 1300 may minimize the sideways motion of the ribbon to avoid excessive movement and to avoid potentially breaking the optical fibers. The clamps 1308 may be used to clamp the ribbon on both sides, outside of the metallized segment of the ribbon, to further minimize any movement that could break one or more of the optical fibers. Alternative embodiments of the invention could use a simpler heater block, a conventional hot-plate, or an equivalent.

Figure 14:
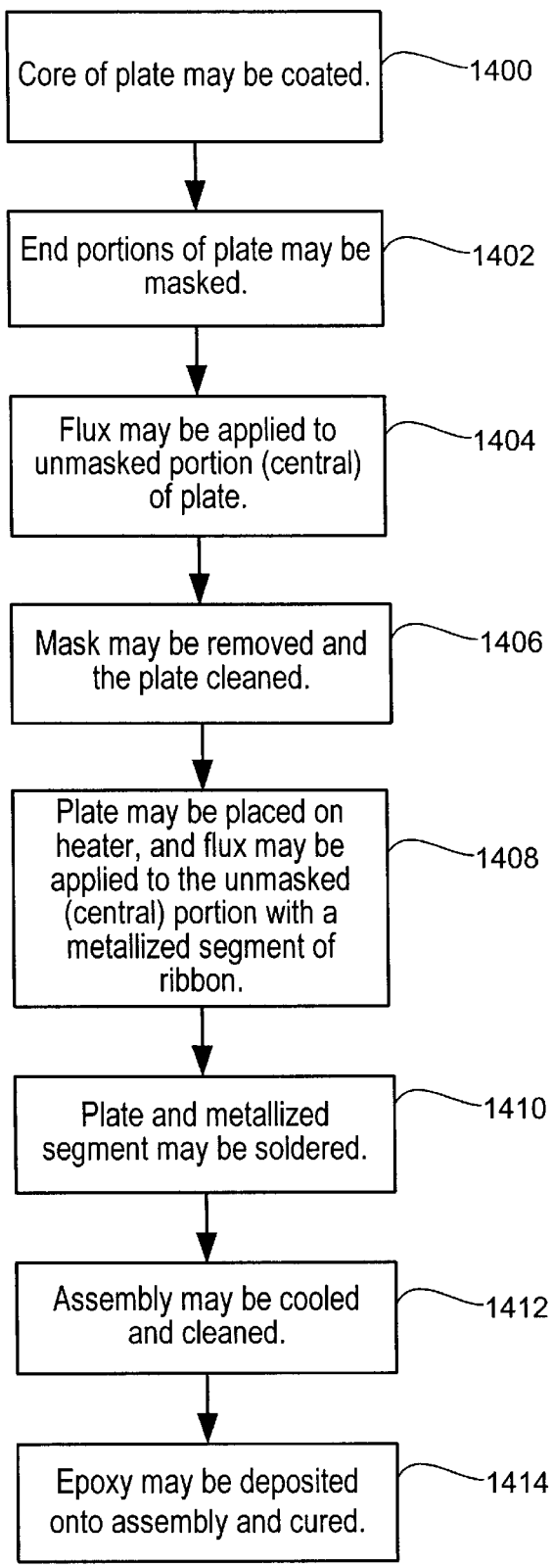
FIG. 14 shows a flow chart with a variation on preparing a reinforcement plate for reinforcing the metallized segment of optical fiber ribbon.

FIG. 14 shows an example of a flow chart for preparing a reinforcement plate for the reinforcement of the metallized segment of optical fiber ribbon. The method may start in operation 1400 where a core, e.g., core 810, may be covered by an evaporation or sputtering process with, e.g., an under-layer 812 of Nickel and an outer-layer 814 of gold. However, other metal coatings may be used in differing variations of the present invention. In operation 1402, the reinforcement plate may have its two end portions, e.g., portions 804 and 806, masked over by tape or a water-soluble liquid solder mask. Any of the tapes as described above may be used. Operation 1404 may follow, where flux may be applied to the unmasked central portion, e.g., middle portion 802, of the reinforcement plate. The reinforcement plate may then be dipped into a solder pot and slowly withdrawn for a substantially uniform coating of solder on the unmasked central portion of the reinforcement plate. Operation 1406 may follow, where the mask (tape or water-soluble solder mask) may then be removed from the reinforcement plate. The plate may then be cleaned with one or more various cleaning fluids, e.g., isopropyl alcohol and/or acetone.

Operation 1408 may follow, where the reinforcement plate may be placed over or upon a heater, e.g., heater block 1300. Flux may then be applied to the reinforcement plate, and a metallized segment of optical fiber ribbon may be placed upon the reinforcement plate and fluxed. Operation 1410 may follow, where the reinforcement plate and metallized segment may be soldered, as described above, and then cooled to solidify the solder, and then cleaned with one or more cleaning fluids, as seen in operation 1412. Operation 1414 may follow, where the assembly may be transferred to, e.g., an epoxy dispenser where epoxy may be deposited to the ends of the reinforcement plate to further attach the optical fiber ribbon to the reinforcement plate. After depositing the epoxy, the assembly may be placed in an oven to thermally cure the epoxy, after which the ribbon and reinforcement plate may be removed from the oven for inspection.

Hermetic Sealing of Metallized Optical Fibers to a Package

Figure 15:
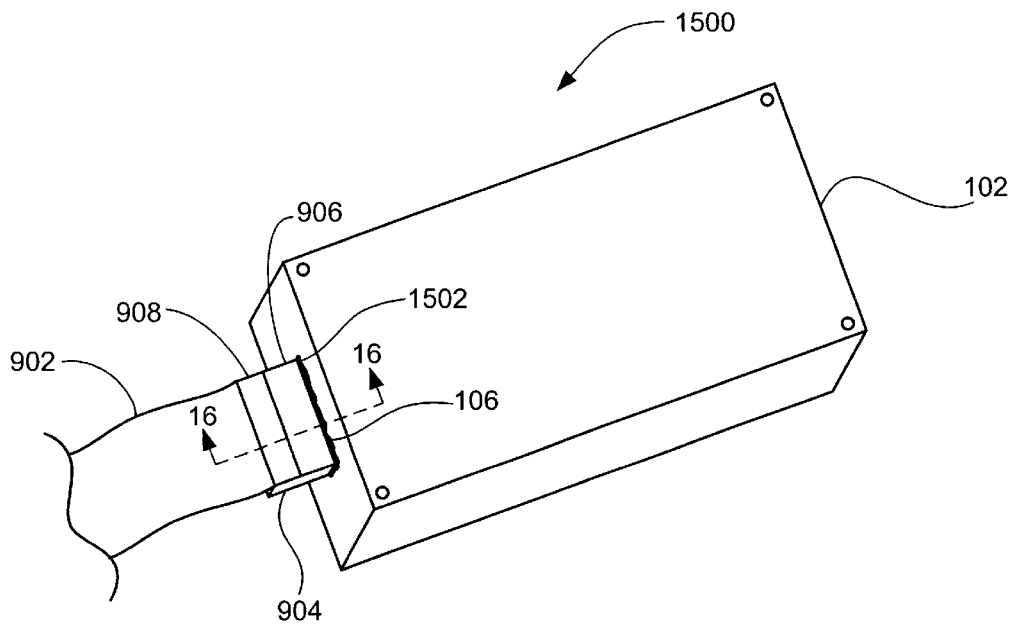
FIG. 15 illustrates an isometric view of an electro-optical system with a ribbon having a reinforcement plate.
Figure 16:
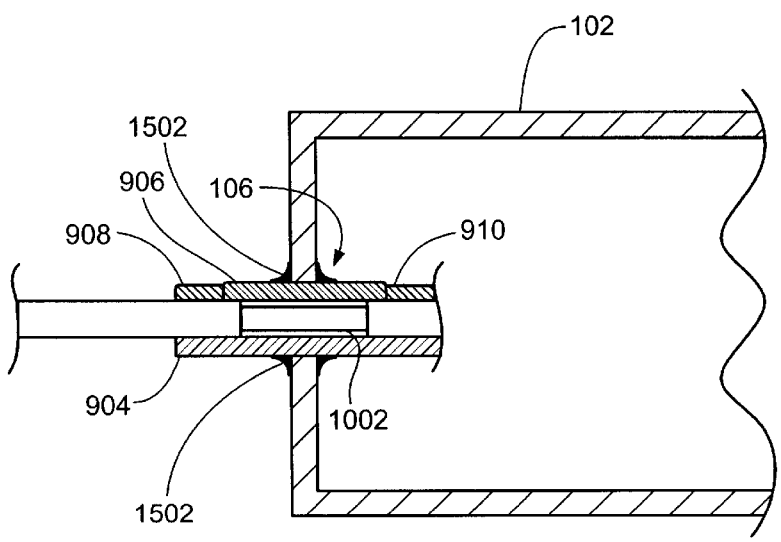
FIG. 16 illustrates a cross-section 16—16 from FIG. 15 of a metallized segment of optical fiber supported by a reinforcement plate, connected through an opening inside a package.

FIG. 15 shows an isometric view of electro-optical system 1500. FIG. 16 shows cross-section 16—16 from FIG. 15 with reinforced plate 904 supporting metallized segment 902 and ribbon 902 through opening 106, according to aspects of the present invention. As shown in both FIGS. 15 and 16, reinforcement plate 904 may extend through package 102 to provide mechanical support to metallized segment 902, which may be soldered and secured to plate 904 via any of the methods and procedures described herein. The reinforcement plate 904 preferably extends about 0.010 to 0.150 in. (0.0254 to 0.381 cm) outside the outer wall of package 102. Alternative variations may have the reinforcement plate 904 extend about 0.050 to 0.250 in. (0.127 cm to 0.635 cm), or more than about 0.250 in. (0.635 cm), beyond the outer wall of the package 102.

Components such as package 102 typically need to be hermetically sealed to preferably attain a maximum leak rate of about $10^{-9}$ AtmCC/sec (air). Accordingly, a package 102 incorporating such a support for mid-span metallized fibers may be sealed by utilizing an approach as described below. Reinforcement plate 904 with the attached metallized segment 902 may first be positioned within the package opening 106. The portion of plate 904 which contacts package opening 106 may be left unsoldered to package opening 106 until package 102 is heated. The entire assembly 1500 may then be placed on a heater block to raise the temperature preferably close to the melting point of the solder used. This temperature may vary depending upon the type of solder used. Once the package 102 approaches the melting point of the solder, flux may be applied to reinforcement plate 904 and to solder 906 on metallized segment 902. Additional solder 1502 may then be further applied around opening 106, plate 904, and solder 906 by melting the additional solder 1502 with, e.g., a soldering iron maintained at a temperature well above the melting point of the additional solder 1502. Any of the solder described herein may be used, e.g., Indium or Indium alloy, to seal the opening 106. Package 102 may then be removed from the heater block to cool down, preferably to room temperature, before flux residue may be cleaned with chemicals, e.g., isopropyl alcohol and/or acetone. Additionally, because Indium-containing solders may be prone to corrosion in salt atmospheres, solder 906 and additional solder 1502 may be covered both inside and outside of package 102 with an epoxy or adhesive, e.g., any of the epoxies or adhesives as described herein. The epoxy may then be cured, e.g., within an oven, to provide adhesion to solder 906 and additional solder 1502 and to the surfaces of package 102.

Figure 17:
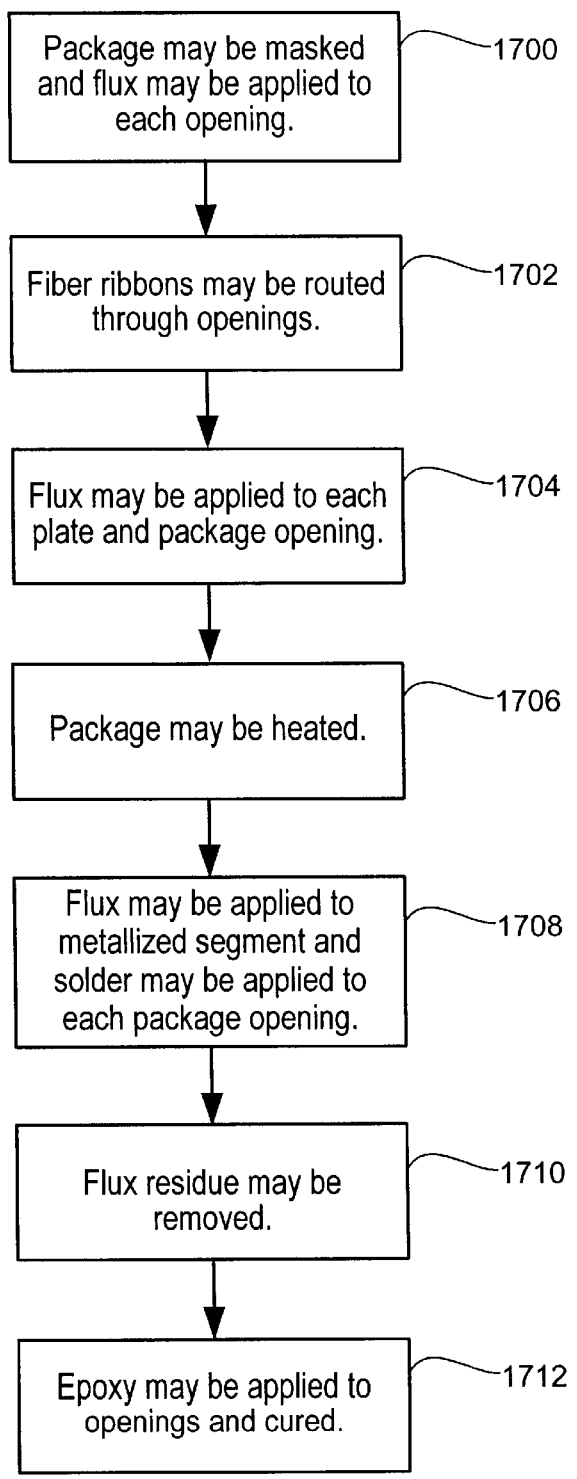
FIG. 17 shows a flow chart of a variation for soldering a metallized segment of optical ribbon supported by a reinforcement plate to a package opening.

FIG. 17 shows an example of a flow chart for soldering a metallized segment of optical ribbon supported by a reinforcement plate, as described above, to a package opening, e.g., package 102. An example of the method may start with providing a stripped and metallized segment, e.g., segment 1002, of optical fiber ribbon, as described above, and affixing the segment to a plate, as described above, then finally sealing the plate through an opening, e.g., opening 106, of a package, e.g., package 102. The method is described in further detail where it may begin 1700 where the package may be masked and have flux applied to the edge of each package opening, which may then be wetted with solder. In operation 1702, once the components may be placed and attached within the package, fiber ribbons may be routed through the package openings. Operation 1704 may follow, where flux is applied to, e.g., the bottom of the central portion of each reinforcement plate and to the edge of each package opening, e.g., around opening 106 of FIG. 16. The metallized segment, e.g., segment 1002, of each ribbon supported by a reinforcement plate may be positioned through the package opening such that the reinforcement plate extends outside the package, preferably by about 0.010 to 0.150 in. (0.0254 cm to 0.381 cm), and the package opening edge is under the solder-coated central portion of the reinforcement plate.

Operation 1706 may follow where the package may be placed on a heater block. Operation 1708 may then follow where flux and solder, e.g., additional solder 1502, may be applied to each package opening, e.g., opening 106, and metallized segment, e.g., segment 1002, of the optical fiber ribbon to completely solder each of the package openings. Operation 1710 may follow where, after cooling, the flux residues may be cleaned away by a chemical such as alcohol and external feedthroughs may be then attached to the outside of the package. Operation 1712 may follow where the openings in the feedthroughs may be filled with epoxy to protect the solder from corrosion and the epoxy may be cured.

After all the package openings are sealed in this manner, the flow chart variation shown in FIG. 18A may be implemented where operation 1800 would then follow. A lid of a preferably low coefficient of thermal expansion (CTE) metal, e.g., Kovar, Invar, Alloy 42, and other low coefficient of thermal expansion alloys, may be aligned onto the package. Under operation 1802, the ribbon and the package may be placed in, e.g., a vacuum chamber of a seam sealer, for a time ranging from about 30 minutes to 8 hours to seam seal the package. Then under operation 1804, the lid may be sealed onto the package. The seam sealer preferably uses two electrodes that may melt metal, e.g., Kovar, in localized areas and hermetically seal the package. In a preferred variation, sealing may take place in a dry box containing about 90% nitrogen and 10% helium. Helium may be used so that parts may be tested for fine leaks without having to pressurize them with helium after sealing. Operation 1806 may be next where the ribbon and the package are removed from the seam sealer.

FIG. 18B shows an alternative flow chart for another variation for sealing a lid to the package after all the package openings are sealed. Accordingly, rather than beginning with operation 1800, this variation may begin with operation 1810, where the package may be heated again and flux and solder may be applied to the entire edge of the top of the package, e.g., package 102. Spacers may be placed in multiple locations along the edge of the top of the package to maintain a specific seam thickness between the top of the package and the lid when the soldering is performed. Operation 1812 may follow where a lid of low CTE metal, e.g., Kovar, Invar, Alloy 42, and other low coefficient of thermal expansion alloys, may be magnetically held and positioned over the edge of the package and the lid soldered onto the package. Operation 1814 may follow where the package may be cooled to solidify the solder. Then operation 1816 may follow where the ribbon and the package may be removed from the heater for inspection. Commercial grade chemicals, e.g., isopropyl alcohol and/or acetone, may be used for cleaning flux residues from the package. Alternative variations may use other cleaning fluids, e.g., halogenated hydrocarbons, terpenes, soap and/or water.

The examples and applications of the apparatus and methods discussed above are not intended to be limiting, but may include any number of further applications. Accordingly, modification of the above-described apparatus and methods for carrying out the present invention, and variations of aspects of the invention that are obvious to those of skill in the art are intended to be within the scope of the claims.

We claim:

1. A method of affixing a non-terminal metallized segment of a ribbon of optical fibers having a proximal end, a distal end, and a length therebetween to a reinforcing plate comprising:

coating a middle portion of the plate with solder; and soldering the non-terminal metallized segment of ribbon of optical fiber to the middle portion, wherein the non-terminal metallized segment is proximal the distal end.

2. The method of claim 1 wherein the plate comprises a core covered by an under-layer and an outer-layer.

3. The method of claim 2 wherein the core comprises a material having a low coefficient of thermal expansion.

4. The method of claim 2 wherein the core material is selected from the group consisting of Kovar, Invar, Alloy 42, Alloy 52, silicon, quartz, ceramic, and glass.

5. The method of claim 2 wherein the under-layer comprises Nickel.

6. The method of claim 2 wherein the outer-layer comprises Gold.

7. The method of claim 2 wherein the plate has a width which is wider than a maximum width of the segment of ribbon of optical fiber.

8. The method of claim 7 wherein the width of the plate is about 0.100 inches wider than the maximum width of the segment.

9. The method of claim 2 wherein the core has a thickness of about 0.005 to 0.100 inches.

10. The method of claim 2 wherein the under-layer has a thickness of about 30 to 200$\mu$-inches.

11. The method of claim 2 wherein the outer-layer has a thickness of about 10 to 100$\mu$-inches.

12. The method of claim 1 wherein the plate defines at least one channel along a length of the plate, the channel being configured to receive at least one optical fiber of the ribbon within the channel.

13. The method of claim 12 wherein the channel comprises a V-groove.

14. The method of claim 12 wherein the channel has at least a first layer of metal deposited within the channel.

15. The method of claim 14 wherein the first layer of metal is selected from the group consisting of Titanium, Chromium, and Nickel.

16. The method of claim 14 wherein the channel has a second layer of metal deposited upon the first layer of metal.

17. The method of claim 16 wherein the second layer of metal is selected from the group consisting of Gold, Silver, Nickel, Copper, Tin, Lead, and Tin-Lead.

18. The method of claim 16 wherein the channel has a third layer of metal deposited upon the second layer of metal.

19. The method of claim 18 wherein the third layer of metal is selected from the group consisting of Gold, Silver, Indium, Tin, Lead, Tin-Lead, and Indium-Lead.

20. The method of claim 1 wherein prior to coating the middle portion of the plate with solder, the method further comprises:

masking a first end and a second end of the plate; and applying a flux to the middle portion of the plate located between the first end and the second end.

21. The method of claim 20 wherein coating the middle portion of the plate with solder further comprises:

removing the masking from the first end and the second end; and heating the plate.

22. The method of claim 21 wherein heating the plate comprises raising a temperature of the plate to about 125° to 175° C.

23. The method of claim 20 wherein the first end and the second end of the plate are masked with tape or solder mask.

24. The method of claim 23 wherein the tape is selected from the group consisting of Kapton and Mylar tape.

25. The method of claim 23 wherein the solder mask comprises a water-soluble liquid solder mask.

26. The method of claim 20 wherein applying the flux to the middle portion of the plate comprises brushing flux onto the middle portion or dipping the plate into the flux.

27. The method of claim 26 wherein the flux comprises no-clean flux.

28. The method of claim 23 wherein the segment of optical fiber is soldered to the middle portion with Indium or Indium alloy solder.

29. The method of claim 23 further comprising cleaning the segment of optical fibers with a chemical.

30. The method of claim 29 wherein the chemical is selected from the group consisting of isopropyl alcohol and acetone.

31. The method of claim 1 further comprising applying an adhesive to a proximal end and a distal end of the segment.

32. The method of claim 31 wherein the adhesive is selected from the group consisting of anhydride epoxy, silicone adhesives, polymer adhesives, and equivalents thereof.

33. A method of sealing a segment of a ribbon of optical fibers in an opening defined in a surface of a package comprising:

affixing the segment of the ribbon of optical fibers to a reinforcing plate according to the method of claim 1, positioning the segment such that the plate extends through the opening;

soldering the segment and the plate to the package around the opening.

34. The method of claim 33 wherein the plate extends through the opening beyond an outer wall of the package.

35. The method of claim 34 wherein the plate extends about 0.010 to 0.250 inches beyond the outer wall.

36. The method of claim 34 wherein the plate extends about 0.050 to 0.150 inches beyond the outer wall.

37. The method of claim 33 further comprising heating the package, segment, and plate to a temperature below a melting point of the solder prior to soldering the segment and the plate to the package.

38. The method of claim 37 further comprising applying a flux to the segment and the plate prior to soldering the segment and the plate to the package around the opening.

39. The method of claim 33 wherein the segment and the plate are soldered with Indium or Indium alloy.

40. The method of claim 33 further comprising cleaning the segment and the plate with a chemical.

41. The method of claim 40 wherein the chemical is selected from the group consisting of isopropyl alcohol and acetone.

42. The method of claim 33 further comprising depositing an adhesive upon the segment and the plate.

43. The method of claim 42 wherein the adhesive is selected from the group consisting of anhydride epoxy, silicone adhesives, polymer adhesives, and equivalents thereof.

44. The method of claim 42 further comprising curing the adhesive.

* * * * *